US007058943B2

(12) United States Patent  (10) Patent No.: US 7,058,943 B2
Blais et al.  (45) Date of Patent: Jun. 6, 2006

(54) OBJECT ORIENTED APPARATUS AND METHOD FOR ALLOCATING OBJECTS ON AN INVOCATION STACK IN A PARTIAL COMPILATION ENVIRONMENT

(75) Inventors: Marc Noel Blais, Rochester, MN (US); Daniel Rodman Hicks, Byron, MN (US); William Jon Schmidt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 764 days.

(21) Appl. No.: 09/865,001

(22) Filed: May 24, 2001

(65) Prior Publication Data
US 2002/0178437 A1 Nov. 28, 2002

(51) Int. Cl.
G06F 9/45 (2006.01)
G06F 9/46 (2006.01)
(52) U.S. Cl. .......................... 718/1; 717/140; 717/155
(58) Field of Classification Search .................. 718/1, 718/100, 104; 717/140, 151, 153–157
See application file for complete search history.

(56) References Cited
U.S. PATENT DOCUMENTS

| 6,237,141 | B1 * | 5/2001 | Holzle et al. | 717/153 |
| 6,505,344 | B1 * | 1/2003 | Blais et al. | 717/151 |
| 6,675,378 | B1 * | 1/2004 | Schmidt | 717/154 |
| 6,851,109 | B1 * | 2/2005 | Alexander et al. | 717/148 |
| 2004/0015920 | A1 * | 1/2004 | Schmidt | 717/153 |

OTHER PUBLICATIONS

Whaley et al., "Compositional Pointer and Escape Analysis for Java Programs", Laboratory for Computer Science Massachusetts Institute of Technology, 1999.*

(Continued)

Primary Examiner—Meng-Al T. An
Assistant Examiner—Syed J Ali
(74) Attorney, Agent, or Firm—Martin & Associates, LLC; Derek P. Martin

(57) ABSTRACT

An object oriented mechanism and method allow allocating Java objects on a method's invocation stack in a partial compilation environment under certain conditions. Only the classes that are visible are taken into account when performing escape analysis in accordance with the preferred embodiments. In a first aspect of the invention, conservative assumptions are made to assure that objects are only allocated on an invocation stack when this can be proven safe by examining only those classes in the compilation unit. In a second aspect of the invention, the concept of visible classes is extended to include other classes that may be found from a user-defined classpath that matches the anticipated run-time classpath used to find classes during program execution. When stack allocation decisions for a method depends on such classes that are outside the compilation unit, two versions of run time code for that method are created. One version allocates all objects from the heap, whereas the other allocates some or all objects on the invocation stack. For each class outside the compilation unit that was examined when making stack allocation decisions for a method, information about the requisite class is stored with the method. At run time, the class loader verifies that the run time version of each requisite class matches all stored information about that class. If all information matches for all requisite classes, the version of the method using stack allocation is safe to use at run time. Otherwise, the method using heap allocation must be used.

10 Claims, 31 Drawing Sheets

OTHER PUBLICATIONS

Choi et al., "Escape Analysis for Java", IBM T.J. Watson Research Center, Nov. 1, 1999.*

Burke et al. "The Jalapeno Dynamic Optimizing Compiler for Java", JAVA '99, ACM, pp. 129-141 (1999).*

Whaley, John. "Partial Method Compilation Using Dynamic Profile Information", Conference on Object Oriented Programming Systems Languages and Applications, ACM, pp. 166-179 (Oct. 2001).*

Choi et al., "Escape Analysis for Java", 14th ACM SIGPLAN Conference on Object Oriented Programming Systems, Languages and Applications, Nov. 1, 1999, pp. 1-19, Denver, Colorado.

Whaley et al., "Compositional Pointer and Escape Analysis for Java Programs", 14th ACM SIGPLAN Conference on Object Oriented Programming Systems, Languages, and Applications, Nov. 1, 1999, 10 pgs., Denver, Colorado.

Bogda et al., "Removing Unnecessary Synchronization in Java", 14th ACM SIGPLAN Conference on Object Oriented Programming Systems, Languages, and Applications, Nov. 1, 1999, pp. 35-46, Denver, Colorado.

* cited by examiner

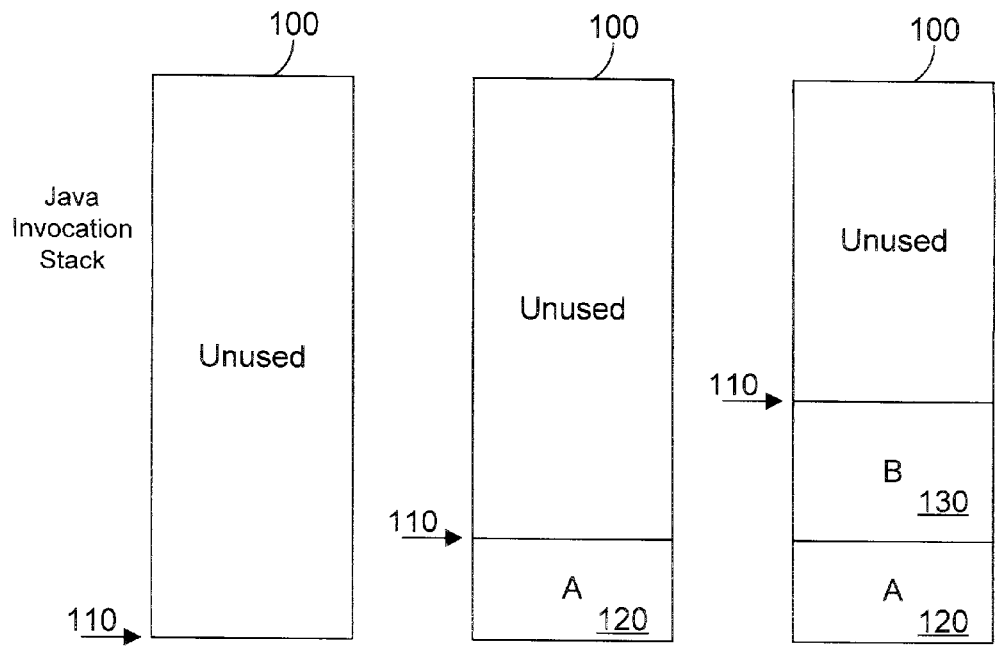
FIG. 1A Prior Art
FIG. 1B Prior Art
FIG. 1C Prior Art
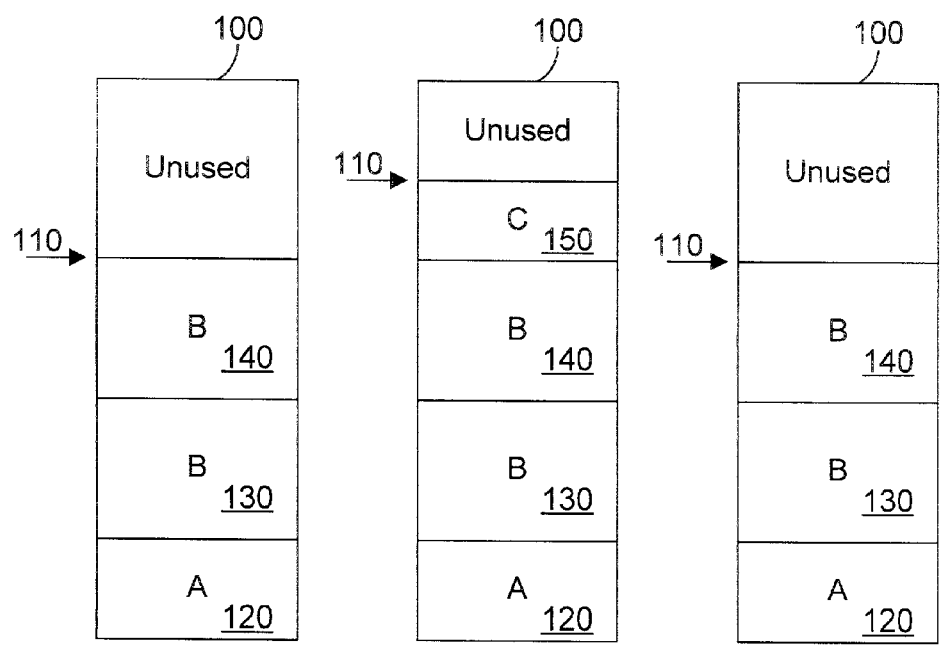
FIG. 1D Prior Art
FIG. 1E Prior Art
FIG. 1F Prior Art

```
C++
A() {
    Square k;
    •
    •
    •
}
```
FIG. 2A  Prior Art
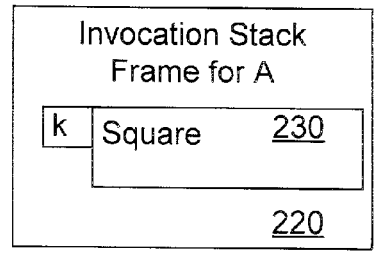
FIG. 2B  Prior Art
```
Java
A() {
    •
    •
    •
    Square k = new Square();
    •
    •
}
```
FIG. 3A  Prior Art
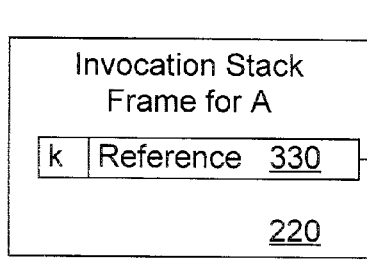
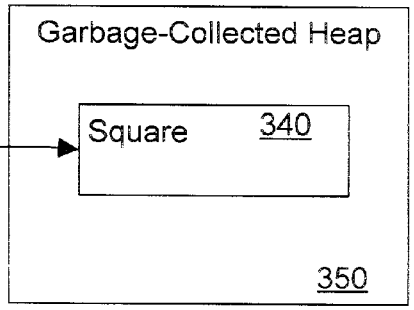
FIG. 3B  Prior Art    FIG. 3C  Prior Art
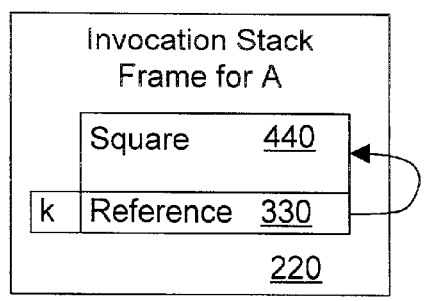
FIG. 4  Prior Art

```
A() {      NO ESCAPE
    •
    •
    •
    Square k = new Square();
    •
    •
    •
}
```

FIG. 5A     Prior Art

```
static Square classVar;
A() {      GLOBAL ESCAPE
    •
    •
    •
    Square k = new Square();
    classVar = k;
    •
    •
    •
}
```

FIG. 5B     Prior Art

```
Square A() {      ARG ESCAPE
    •
    •
    •
    Square k = new Square();
    return k;
    •
    •
    •
}
```

FIG. 5C     Prior Art

```
A(List L) {      ARG ESCAPE
    •
    •
    •
    Square k = new Square();
    L.addToList(k);
    •
    •
    •
}
```

FIG. 5D     Prior Art

```
class Instrument {
        abstract void identify();
};

final class Intensity {
        Intensity(int t, int f) {privT=t; privF=f;}
        int tautness() {return privT;}
        int force() {return privF;}
        private int privT;
        private int privF;
};

class WindInstrument extends Instrument {
        final void identify() {System.out.println("Wind instrument");}
        void blow(int force) { . . . }
        abstract void setEmbouchure(int tautness);
        abstract void loudHighNote(Intensity i);
} final class Valve {
        private Boolean depressed;
        void depress() {depressed=true;}
        void release() {depressed=false;}
};

class BrassInstrument extends WindInstrument {
        private Valve[ ] valves;
        BrassInstrument (Valve[ ] v) {valves=v;}
        private Valve getValve(int i) {return valves[i];}
        void depressValve(Valve which) {which.depress();}
        final void setEmbouchure(int tautness) { . . . }
        void loudHighNote(Intensity i) {
                depressValve(getValve(2));
                setEmbouchure(i.tautness)());
                blow(i.force());
        }
};
```

FIG. 19A

```
class WoodwindInstrument extends WindInstrument {
    void depressKey(int which) { . . . }
    void setEmbouchure(int tautness) { . . . }
    void loudHighNote(Intensity i) {
        depressKey[4];
        setEmbouchure(i.tautness());
        blow(i.force());
    }
};

class Drumstick { . . . };

class Mallet extends Drumstick { . . . };

public class Player {
    void messAroundWith(Instrument ax) {
        ax.identify();
        Intensity inten = new Intensity (6,88);   //S1
        ax.loudHighNote(inten);
    }
    void beatDrum(Drum drum) {
        Intensity inten = new Intensity(1,1);   //S2
        Drumstick m = new Mallet();             //S3
        drum.strikeWith(m);
    }
};
```

FIG. 19B

```
class PercussionInstrument extends Instrument { . . . } class Drum extends PercussionInstrument {
    final void strikeWith(Drumstick d) {System.out.println("Boom"); }
};

class Percussionist extends Player {
    void acquireEquipment() {
        Drum d = new Drum();    //S4
        Mallet m = new Mallet();   //S5
    }
};
```

FIG. 20

(1) Valve.release
(3) Valve.depress
(5) BrassInstrument.setEmbouchure
(7) WindInstrument.blow
(8) Intensity.tautness
(9) Intensity.force
(10) WoodwindInstrument.setEmbouchure
(11) Woodwindinstrument.depressKey
(14) WindInstrument.identify
(15) Intensity.<init>
(16) Mallet.<init>

(2) BrassInstrument.<init>

(6) BrassInstrument.getValve

Before Call to Valve.depress

Final Connection Graph

Before call to BrassInstrument.getValve

Before call to BrassInstrument.depressValve

Before call to Intensity.tautness

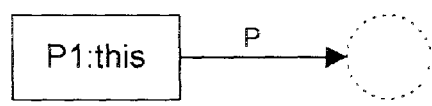
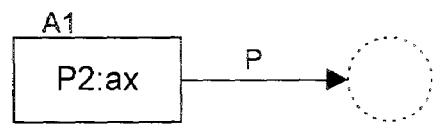
Before call to Instrument.identify
FIG. 28A
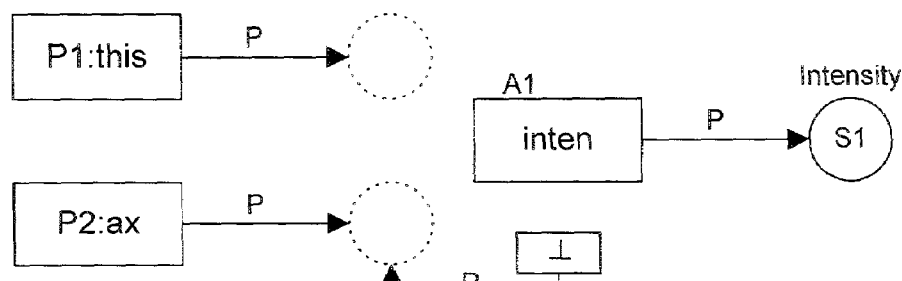
Before call to Intensity.<init>
FIG. 28B
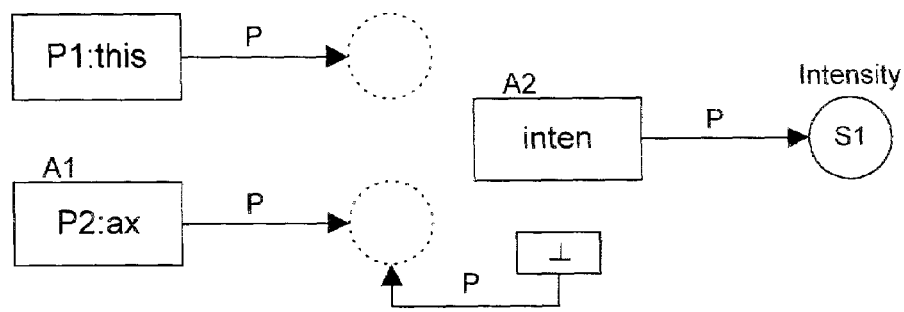
Before call to Instrument.loudHighNote
FIG. 28C Final Connection Graph Before Call to Intensity.<init>

Before Call to Mallet.<init>

Before Call to Drum.strikeWith

Final Connection Graph

Before Call to Drum.<init>

Before Call to Mallet.<init>

Final Connection Graph

Before Call to Drum.<init>

Before Call to Mallet.<init>

Final Connection Graph

OBJECT ORIENTED APPARATUS AND METHOD FOR ALLOCATING OBJECTS ON AN INVOCATION STACK IN A PARTIAL COMPILATION ENVIRONMENT

BACKGROUND OF THE INVENTION

1. Technical Field

This invention generally relates to the data processing field. More specifically, this invention relates to the location of object creation in object oriented systems.

2. Background Art

Since the dawn of the computer age, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems typically include operating system software that controls the basic function of the computer, and one or more software application programs that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the application software programs designed for high performance computer systems have become extremely powerful. Additionally, software development costs have continued to rise because more powerful and complex programs take more time, and hence more money, to produce.

One way in which the performance of application software programs has been improved while the associated development costs have been reduced is by using object oriented programming concepts. The goal of using object oriented programming is to create small, reusable sections of program code known as "objects" that can be quickly and easily combined and re-used to create new programs. This is similar to the idea of using the same set of building blocks again and again to create many different structures. The modular and re-usable aspects of objects will typically speed development of new programs, thereby reducing the costs associated with the development cycle. In addition, by creating and re-using a comprehensive set of well-tested objects, a more stable, uniform, and consistent approach to developing new computer programs can be achieved.

The Java programming language developed by Sun Microsystems is one modem object oriented programming language that has become very popular in recent years. From a programmer's point of view, one of the advantages of the Java programming language is that memory allocation and reclamation are handled entirely by the run time system, which relieves the programmer of the burden of determining how and when to destroy unneeded objects. All objects (other than those of primitive types) are allocated from a common "heap", or section of memory. A garbage collection mechanism then monitors the objects in the heap, and periodically deletes unneeded objects, thereby reclaiming portions of the heap that are occupied by objects that can no longer be accessed from the user's program.

One problem with the Java automatic allocation and reclamation of memory is that users have less control over their program's performance. Each time an object is allocated, a certain cost is incurred as the memory manager updates its data structures. Furthermore, an additional cost must be paid to reclaim the object during garbage collection. Although these costs are small when considered individually, the sheer frequency of object allocation and reclamation result in a significant portion of program execution time being spend in the memory manager, allocating and reclaiming memory for objects.

Java's memory management overhead is far greater than that of the C++ programming language, primarily because every Java object is allocated from the heap. In C++, programmers are given more control over the allocation of their objects. In particular, C++ programmers are able to declare objects to be local to a method. These objects come into existence when the method is invoked, and are automatically reclaimed when the method invocation terminates. Further, the run time cost of allocating these objects is essentially zero, since they simply occupy space in the method's invocation stack frame. Adding an object to the invocation stack frame simply means that the amount by which the stack pointer is moved must increase, but no additional instructions are required to do this. Compare this with Java, where every created object, no matter how small or how temporary, requires overhead from the run time memory manager.

Recently, researchers in compiler technology have been working on ways to allocate some Java objects on a method's stack frame, rather than going to the heap for each and every object, thereby improving on the performance of the native Java capabilities. In particular, if a compiler can automatically detect Java objects whose "lifetimes" do not extend beyond the method in which they are created, these objects can be automatically allocated on the stack by the compiler rather than from the garbage-collected heap, resulting in improved performance. The technology used to determine which objects may be allocated on the stack is called "escape analysis". The idea is to determine which objects have lifetimes that do not "escape" from the methods that create them. Escape analysis is presented in a paper by Choi et al., "Escape Analysis for Java". in Proceedings of the Conference on Object Oriented Programming, Systems, and Languages (OOPSLA), Denver, Colo. (November 1999), p. 1–19. Escape analysis as described by Choi et al. is limited to allocating objects on a method's stack if their lifetimes do not escape from their creating method.

Allocating objects onto a stack by a compiler has never been attempted in a partial compilation environment, where all of the classes and methods in a program are not known or visible at compile time because of calls across compilation units and because of virtual method calls that are not resolved until run time. As explained above, performing Choi's escape analysis requires knowledge of the lifetimes of the objects being created. Because programs in a partial compilation environment may not include all classes needed for the computer program to run, the lifetime of an object sometimes cannot be determined. For these reasons, escape analysis has not been used in a partial compilation environment. Without an apparatus and methods for allocating Java objects to a method's call stack in a partial compilation environment, the computer industry will continue to suffer undue performance limitations caused by allocating Java objects from the heap that could be allocated on a method's stack.

DISCLOSURE OF INVENTION

According to the preferred embodiments, an object oriented mechanism and method allow allocating Java objects on a method's invocation stack in a partial compilation environment under certain conditions. Only the classes that are visible are taken into account when performing escape analysis in accordance with the preferred embodiments. In a first aspect of the invention, conservative assumptions are made to assure that objects are only allocated on an invocation stack when this can be proven safe by examining only those classes in the compilation unit. In a second aspect of the invention, the concept of visible classes is extended to include other classes that may be found from a user-defined classpath that matches the anticipated run-time classpath used to find classes during program execution. When stack allocation decisions for a method depend on such classes that are outside the compilation unit, two versions of run time code for that method are created. One version allocates all objects from the heap, whereas the other allocates some or all objects on the invocation stack. For each class outside the compilation unit that was examined when making stack allocation decisions for a method, information about the requisite class is stored with the method. At run time, the class loader verifies that the run time version of each requisite class matches all stored information about that class. If all information matches for all requisite classes, the version of the method using stack allocation is safe to use at run time. Otherwise, the method using heap allocation must be used.

The foregoing and other features and advantages of the invention will be apparent from the following more particular description of preferred embodiments of the invention, as illustrated in the accompanying drawings.

BRIEF DESCRIPTION OF DRAWINGS

The preferred exemplary embodiments of the present invention will hereinafter be described in conjunction with the appended drawings, where like designations denote like elements, and:

FIGS. 1A–1F are each block diagram representations of a prior art invocation stack in various states;

FIG. 2A is a diagram of C++ pseudo-code;

FIG. 2B is a block diagram showing the object allocation for the C++ code of FIG. 2A in accordance with the prior art;

FIG. 3A is a diagram of Java pseudo-code;

FIGS. 3B and 3C are block diagrams that show the object allocation for the Java code of FIG. 3A in accordance with the prior art;

FIG. 4 is a block diagram showing the allocation of a Java object on an invocation stack frame in accordance with the prior art;

FIGS. 5A–5D are diagrams that show Java pseudo-code examples for no escape, global escape, and arg escape in accordance with the prior art;

FIGS. 19A and 19B each show pseudo-code that is in a first compilation unit;

FIG. 20 shows pseudo-code that is in a second compilation unit;

FIGS. 28A–28D show a series of connection graphs generated during the processing of the Player.messAroundWith method;

BEST MODE FOR CARRYING OUT THE INVENTION

Figure 6:
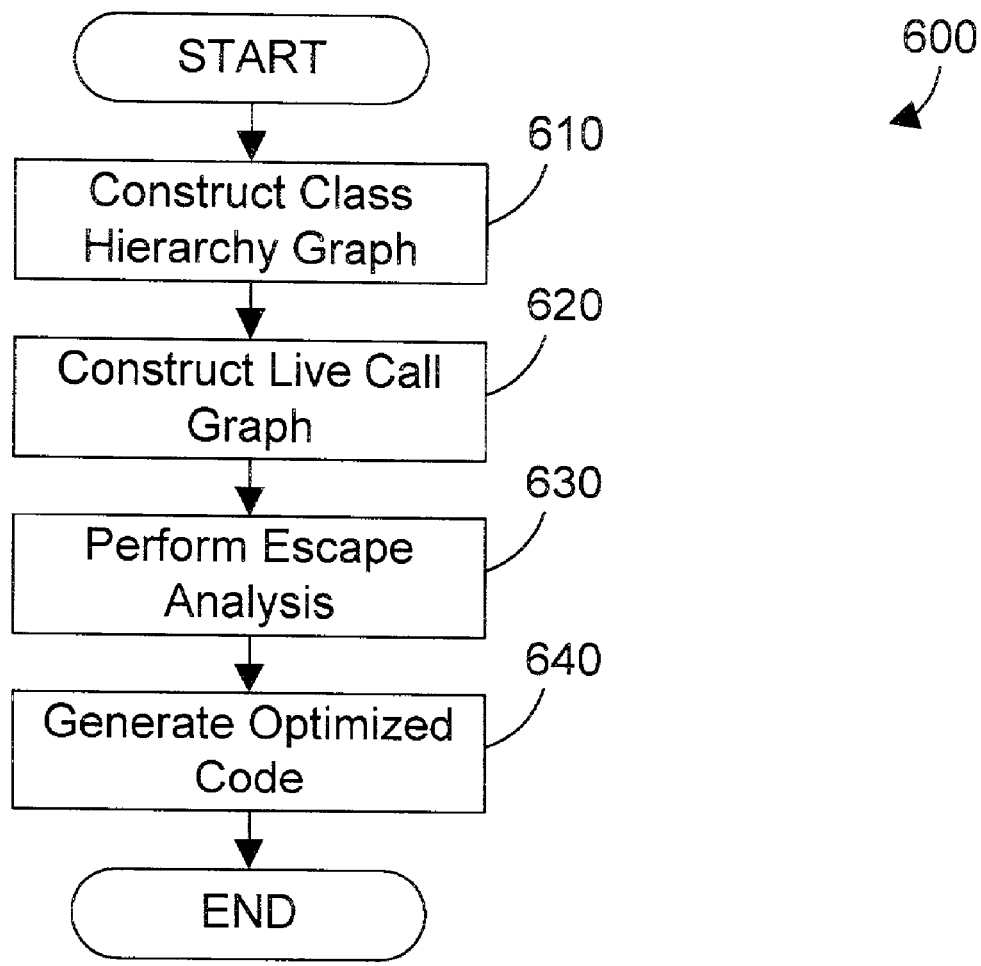
FIG. 6 is a flow diagram of a prior art method for allocating objects in a Java program.

The present invention relates to object oriented programming techniques. For those individuals who are not generally familiar with object oriented programming, the Overview section below presents many of the concepts that will help to understand the invention.

OVERVIEW

Object Oriented Technology v. Procedural Technology

Object oriented programming is a method of implementation in which programs are organized as cooperative collections of objects, each of which represents an instance of some class, and whose classes are all members of a hierarchy of classes united via inheritance relationships. Object oriented programming differs from standard procedural programming in that it uses objects, not algorithms, as the fundamental building blocks for creating computer programs. This difference stems from the fact that the design focus of object oriented programming technology is wholly different than that of procedural programming technology.

The focus of procedural-based design is on the overall process that solves the problem; whereas, the focus of object oriented design is on how the problem can be broken down into a set of autonomous entities that can work together to provide a solution. The autonomous entities of object oriented technology are, of course, objects. Said another way, object oriented technology is significantly different from procedural technology because problems are broken down into sets of cooperating objects instead of into hierarchies of nested computer programs or procedures.

Thus, a pure object oriented program is made up of code entities called objects. Each object is an identifiable, encapsulated piece of code that provides one or more services when requested by a client. Conceptually, an object has two parts, an external object interface and internal object data. In particular, all data is encapsulated by the object interface such that other objects must communicate with that object through its object interface. The only way to retrieve, process or otherwise operate on the encapsulated data is through the methods defined on the object. This protects the internal data portion of the object from outside tampering. Additionally, because outside objects have no access to the internal implementation of an object, that internal implementation can change without affecting other aspects of the program.

In this way, the object system isolates the requester of services (client objects) from the providers of services (server objects) by a well defined encapsulating interface. Thus, in the classic object model, a client object sends request messages (e.g., method calls) to server objects to perform any necessary or desired function. The message identifies a particular server object and specifies what method is to be performed by the server object, and also supplies any required parameters. The server object receives and interprets the message, and can then determine what service to perform.

Because all operations on an object are expressed as methods called from one object to another, methods can be called by objects in other processes. Objects that reside in one process and that are capable of calling methods on an object in another process (such as a process on a remote computer system) are known as distributed objects.

Many distributed object systems allow interaction between objects in remote locations over a communications link. In a distributed object system a "client object" in one location calls methods on a "server object" in another location, which may be a remote location. The client object—server object interactions form the basis for the distributed object system.

Another central concept in object oriented programming is the class. A class is a template that defines a type of object. A class outlines the makeup of objects that belong to that class. By defining a class, objects can be created that belong to the class without having to rewrite the entire definition for each new object as it is created. This feature of object oriented programming promotes the reusability of existing definitions and promotes efficient use of program code. Each class has corresponding configuration data that determines the features or attributes of the class. Changing the configuration data for a class changes the existing class to a new class.

There are many computer languages that presently support object oriented programming techniques. For example, Smalltalk, Object Pascal, C++ and Java are all examples of programming languages that support object oriented programming to one degree or another.

Java Programming Language

Java is a modern object oriented programming language designed by Sun Microsystems that has grown in popularity in recent years. Java offers many features and advantages that makes it a desirable programming language to use. First, Java is specifically designed to create small application programs, commonly called "applets," that can reside on the network in centralized servers, and which are delivered to the client machine only when needed. Second, Java is completely platform independent. A Java program can be written once and can then run on any type of platform that contains a Java Virtual Machine (JVM). The JVM model is supported by most computer vendors, thereby allowing a software vendor to have access to hardware and software systems produced by many different companies. Finally, Java is an object oriented language, meaning that software written in Java can take advantage of the benefits of object oriented programming techniques.

As in other object oriented systems, operations in Java are performed by one object calling a method on another object. These objects can reside locally on the same machine or on separate JVM's physically located on separate computers or systems.

Invocation Stacks in Java

The Java programming language defines one or more invocation stacks that are used to store information when a method is called (or invoked). FIG. 1 shows various views of an invocation stack 100 in different states. Referring to FIG. 1A, invocation stack 100 is shown before any methods are invoked, with its stack pointer 110 at the bottom of the stack. Entries are stored on the stack bottom up. Note that the stack pointer could equally be at the top of the stack, with the entries stored on the stack top down. FIG. 1B illustrates what happens when method A is invoked. An invocation stack frame 120 for A is pushed on the stack, and the stack pointer 110 is then moved to the next available location on the stack.

An invocation stack frame can contain many different types of data. For example, an invocation stack frame can contain the stored state of all processor registers when the method was invoked, so that some or all of these values can be restored when the method has completed. An invocation stack frame can also contain storage for any variables that are local to the method. Thus, if an integer m is declared as a local variable, the invocation stack frame would contain the memory allocation for m. The prior art recognized that object invocations whose lifetimes do not escape the invoking method may also be stored on the stack frame as well.

Referring to FIG. 1C, we assume that in the execution of method A, method B is invoked, so the stack frame 130 for method B is pushed on the invocation stack 100, and the stack pointer 110 is moved to the next available location. We assume that method B calls itself, which causes another instance 140 of a stack frame for method B to be stored on the invocation stack 100, with the stack pointer 110 moved to the next available location, as shown in FIG. 1D. We assume that the second invocation of method B then calls method C, so the stack frame 150 for method C is then pushed onto the invocation stack and stack pointer 110 is moved to the next available location. At this point we assume that method C does not call any other methods, and runs to completion. This causes the stack pointer 110 to move down to the beginning of the stack frame for method C, effectively reclaiming the area of the invocation stack 100 that was used for stack frame 150. The example illustrated in FIGS. 1A–1F (and especially in FIG. 1F) makes it clear that allocating an object on a stack frame does not create any additional overhead. It may require that stack pointer 110 move a little farther to make room for the object, but this does not create any run time performance penalty. Because of this, the more objects we can allocate to the invocation stack, the better the performance of the resulting code will generally be.

A difference between C++ and Java is illustrated in FIGS. 2 and 3. Referring to FIG. 2A, we assume that a "Square" is a name of a particular type of object. A programmer in C++ can declare a variable as being of a "type" that is an object. As shown in FIG. 2A, the statement "Square k" is a declaration of a variable "k" that is of the type "Square", which is an object. When a variable is defined as an object, as in FIG. 2A, the object can be allocated directly on the invocation stack frame for the method, as shown in FIG. 2B. The Square object 230 that corresponds to k is stored on the invocation stack frame 220 for A.

In Java, variables do not denote objects, but instead denote references (i.e., pointers) to objects. Referring to FIG. 3A, the declaration Square k=new Square( ) is a statement that says that variable k is a reference to a new object of type Square. Only the reference 330 (representing k) is stored in the stack frame 220 for the method, as shown in FIG. 3B; the Square object 340 pointed to by reference 330 is allocated from the heap 350, as shown in FIG. 3C.

Prior Art Escape Analysis

The "escape analysis" performed by Choi et al. in "Escape Analysis for Java", in Proceedings of the Conference on Object Oriented Programming, Systems, and Languages (OOPSLA), Denver, Colo. (November 1999), p. 1–19, determines whether the lifetime of an object "escapes" the method that creates the object. If not, the object itself 440 can be allocated on the stack, as shown in FIG. 4. Even though k is still a reference 330, the object 440 to which it points can also be stored on the invocation stack frame 220 for the method that creates the object 440. As described above with reference to FIG. 1, allocating objects to a method's invocation stack frame significantly enhances performance of the computer program.

Examples of Java pseudo-code are presented in FIGS. 5A–5D to illustrate examples of allocation instructions that are "no escape" (FIG. 5A), "global escape" (FIG. 5B), and "arg escape" (FIGS. 5C and 5D). In FIG. 5A, a variable k is defined as a reference to a new object of type Square, but we assume that the lifetime of the allocated object referenced by k does not escape method A. The prior art Choi approach allocates all objects (with some restrictions) for no escape allocations on the method's invocation stack frame. FIG. 5B shows the same variable declaration in FIG. 5A, but later in method A( ) there is another declaration of a variable classVar that is a reference to the object referenced by k. We assume that classVar is a class variable declaration, which means that its lifetime extends globally beyond method A( ), making this allocation a global escape case. The prior art Choi approach allocates all objects that are global escape to the heap.

FIG. 5C has the same declaration statement for k as FIG. 5A, but includes a statement that returns a reference to the allocated object referenced by k from method A( ). This return value means that the lifetime of the allocated object may potentially extend beyond method A( ), but we don't know to what extent. FIG. 5D shows a different case for arg escape. An instruction L.addToList(k) adds the reference k to a list. The allocated object referenced by k can thus potentially be accessed outside of method A( ), but is not necessarily accessed. These cases illustrate the "arg escape" case, where an argument or return value causes the lifetime of an object to potentially extend beyond the scope of the method that creates the object. The prior art Choi approach treats arg escape cases the same as global escape, forcing these allocations to the heap.

The prior art method disclosed in Choi et al. is represented in simplified form in the method 600 of FIG. 6. First, a class hierarchy graph is constructed (step 610). The class hierarchy graph represents inheritance relationships among all classes in a Java program. There is a node in the class hierarchy graph for each class in the program, and there is an arc in the class hierarchy graph from the node for class B to the node for class A if and only if B directly inherits from (i.e., "extends") class A.

Once a class hierarchy graph is constructed in step 610, a live call graph is constructed (step 620). The live call graph contains one node for every method in a Java program that can apparently be called during that program's execution. Methods that can be called from outside the Java program (such as "main") are designated as "root methods." The node for a method A contains an arc to a subnode for each call site contained in A. There is an arc from the subnode for a call site S to the node for method B if it appears possible for method B to be called at call site S. By definition, every method in a live call graph can be reached from at least one root node by a directed sequence of arcs; methods that cannot be executed ("dead methods") are not represented in the live call graph. A method that calls no other method is designated as a "leaf method." The class hierarchy graph is consulted at virtual method call sites to determine which methods may potentially be called, based on inheritance. Construction of class hierarchy graphs and live call graphs are well known in the art.

Once a live call graph has been built in step 620, an escape analysis can be performed (step 630). An escape analysis means that each allocation instruction (that creates an object) is labeled as one of the three options: no escape, global escape, and arg escape. Once the escape analysis in step 630 is complete, the code is then generated (step 640) using the information in the escape analysis to determine where each object is allocated. In the prior art Choi et al. approach of method 600, objects that are no escape are allocated on the invocation stack frame of the method that creates the object, while objects that are global escape and arg escape are allocated from the heap. Note, however, that the prior art Choi et al. approach has never been used in a partial compilation environment because the lifetimes of methods cannot be computed if all of the classes are not present. Thus, it is important to understand that applying the principles of escape analysis taught in Choi et al. in a partial compilation environment has not been performed in the prior art because the basic rules for using the Choi et al. approach (namely, that all classes are present and known) cannot be met in a partial compilation environment.

Figure 7:
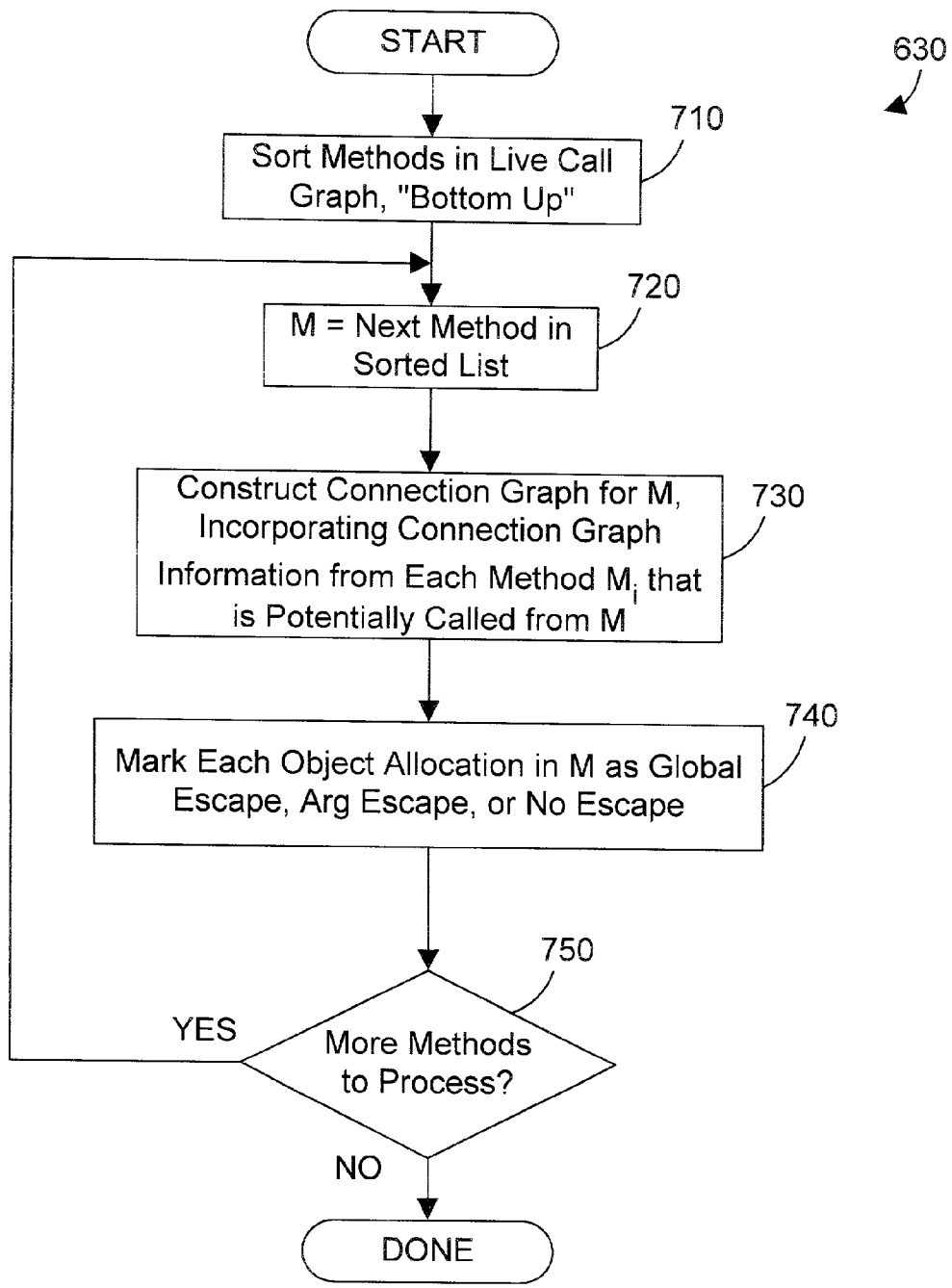
FIG. 7 is a flow diagram of a prior art method for performing step 630 of FIG. 6.

Details of the escape analysis step 630 of FIG. 6 are shown in the flow diagram of FIG. 7. First, the methods in the live call graph are sorted from the bottom up (step 710). This means that leaf nodes in the graph are considered first, which do not call other methods. The first method on the sorted list is then assigned to M (step 720). A connection graph is then constructed for M, incorporating connection graph information for each method (denoted $M_1$) that is potentially called from M (step 730). A connection graph denotes potential relationships among variables and parameters that may reference objects, statements that allocate objects, and fields contained in objects. Next, each object allocation in M is marked as global escape, arg escape, or no escape (step 740). If more methods need to be processed (step 750=YES), control is passed to step 720 and processing continues. Once all methods have been processed (step 750=NO), step 630 is done. Note that the description of a connection graph herein is simplified for the purpose of illustrating the preferred embodiments of the invention. For more details regarding how to construct a connection graph, see the Choi et al. article referenced above.

Figure 8:
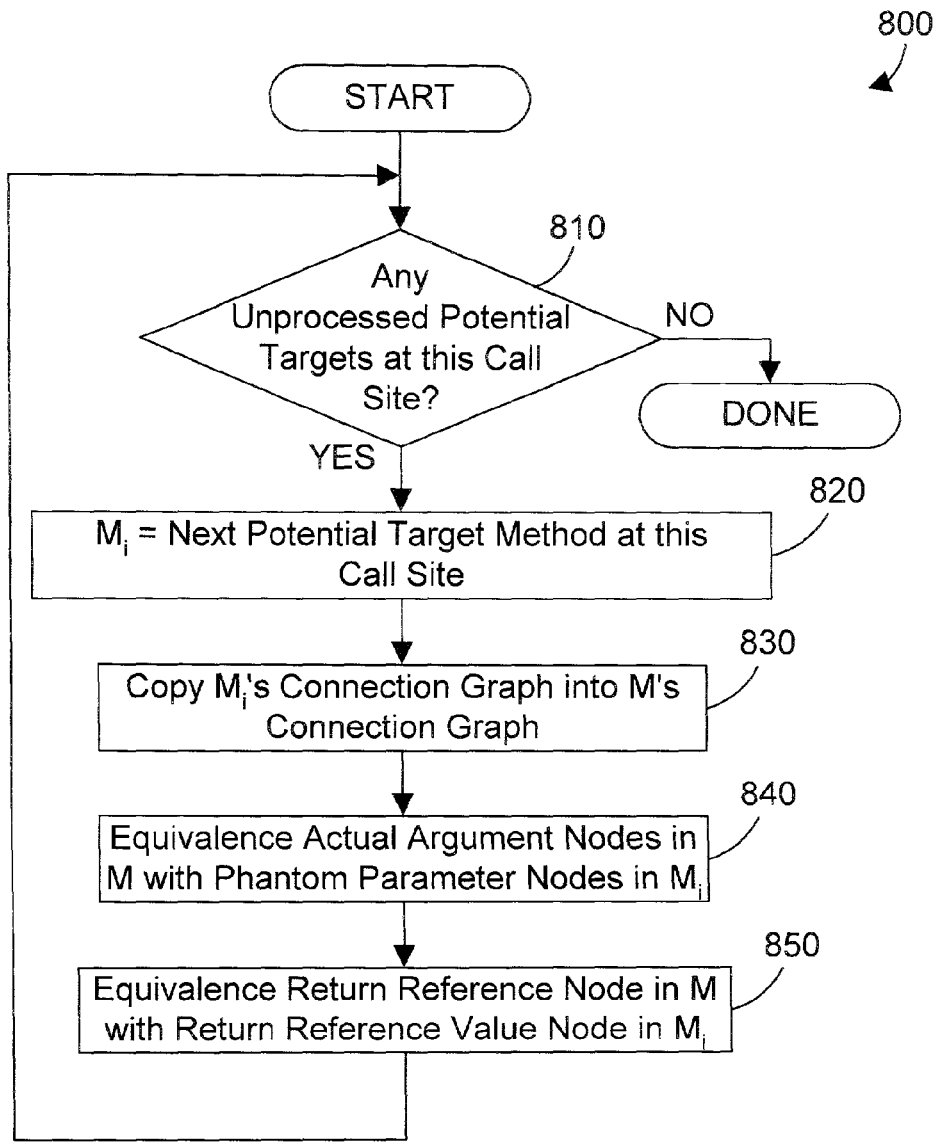
FIG. 8 is a flow diagram of a prior art method for processing a call site.

Referring to FIG. 8, one specific method for processing a call site in accordance with the prior art is shown as method 800. Note that the steps of method 800 are preferably performed during step 730 shown in FIG. 7 for each call site in the connection graph for method M. If there are any unprocessed potential target methods at the selected call site (step 810=YES), the next potential method is selected and assigned as $M_1$ (step 820). Next, $M_1$'s connection graph is copied into M's connection graph (step 830). The actual argument nodes in M are equivalenced to phantom parameter nodes in $M_1$ (step 840). Next, the return reference node in M is equivalenced to the return reference value node in $M_I$ (step 850). The process of equivalencing is complex, and described in full in section 4 of Choi et al. The general idea is to ensure that the actual arguments in the caller are identified with the formal parameters of the callee. Once there are no more unprocessed potential target methods at this call site (step 810=NO), method 800 in FIG. 8 is done.

Figure 9:
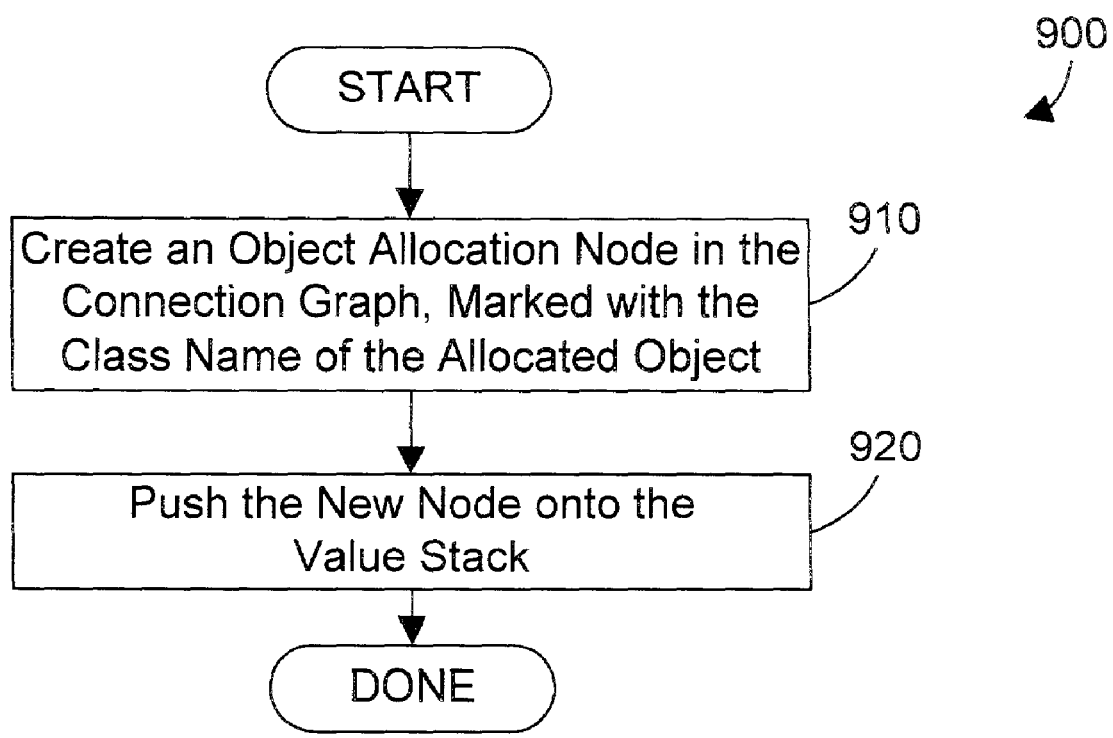
FIG. 9 is a flow diagram of a prior art method for processing an object allocation site.

Referring to FIG. 9, one specific method for processing an object allocation in accordance with the prior art as described in Choi et al is shown as method 900. Like method 800 in FIG. 8, the steps in method 900 in FIG. 9 are preferably performed during step 730 shown in FIG. 7 for each object allocation. First, an object allocation node is created in the connection graph for the new byte-code corresponding to M, with the object allocation node being marked with the class name of the allocated object (step 910). Next, the new node is pushed onto the value stack (step 920). The value stack is used to emulate the semantics of the bytecodes as described in section 3 of Choi et al.

Figure 10:
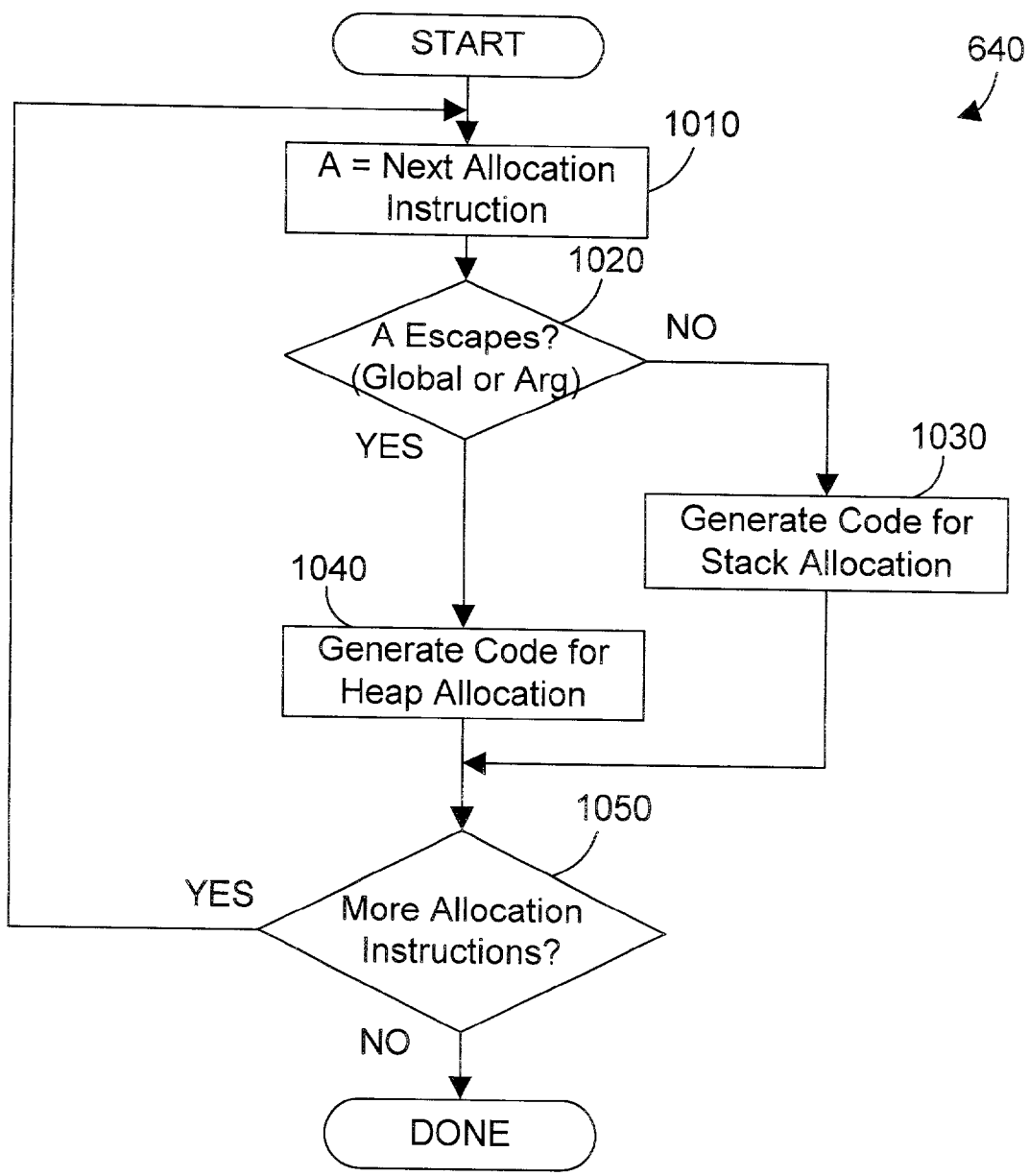
FIG. 10 is flow diagram of a prior art method for performing step 640 of FIG. 6.

One known method for generating optimized code using the escape analysis information is shown as method 640 of FIG. 10, which corresponds to step 640 in FIG. 6. An allocation instruction is selected (step 1010). If the allocation instruction escapes (either global escape or arg escape) (step 1020=YES), code for the method is generated that uses heap allocation for the object (step 1040). If the allocation instruction does not escape (i.e., the allocation instruction is "no escape") (step 1020=NO), the code for the method is generated that uses stack allocation for the object (step 1030). If there are more object allocation instructions (step 1050=YES), control is passed to step 1010 and processing continues until there are no more object allocation instructions to process (step 1050=NO).

It is very important to note at this point that the prior art escape analysis as described above with respect to FIGS. 6–10 has only been used in a static compilation environment, where all of the classes are present at the same time. The decision of whether the lifetime of an object "escapes" the method that created the object requires knowledge of all of the definitions and uses of the object. With a Java program that is statically compiled, all of the definitions and uses of the object can generally be determined. However, in a partial compilation environment, there may be classes in one compilation unit that are not present in another compilation unit. Thus, all of the definitions and uses of an object are not known by the compiler, because it only considers the classes in a single compilation unit it is compiling. For these reasons, the prior art escape analysis has never been applied to a partial compilation environment.

DETAILED DESCRIPTION

An apparatus and method in accordance with the preferred embodiments perform an escape analysis, similar to the Choi et al. escape analysis known in the prior art, on objects that are allocated in a partial compilation environment, i.e., when classes are spread across multiple compilation units. The apparatus and method of the present invention performs escape analysis on classes visible in a particular compilation unit to determine whether to allocate an object on an invocation stack or on the heap based on the available information. Because information in other compilation units is not available, conservative assumptions are made regarding calls to methods that are outside of the current compilation unit. By stack allocating certain objects in a partial compilation environment, the performance of the computer program at run time is improved.

In a second aspect of the present invention, a user of the invention may compile a single compilation unit using analysis information from other compilation units that will be referenced at run time. Only the classes in the single compilation unit are compiled, but stack allocation decisions for methods in those classes are made assuming that the classes from the other compilation units will be available at run time. Whenever a stack allocation decision for a method is made that requires an external class to be available at run time, information about the external class is stored with the compiled code for the method. Two versions of compiled code are created for the method, one using some stack allocations and one using only heap allocations. If the correct external class is not found at run time, the heap-allocation version of the method is used, otherwise the more efficient stack-allocation version is used.

Figure 11:
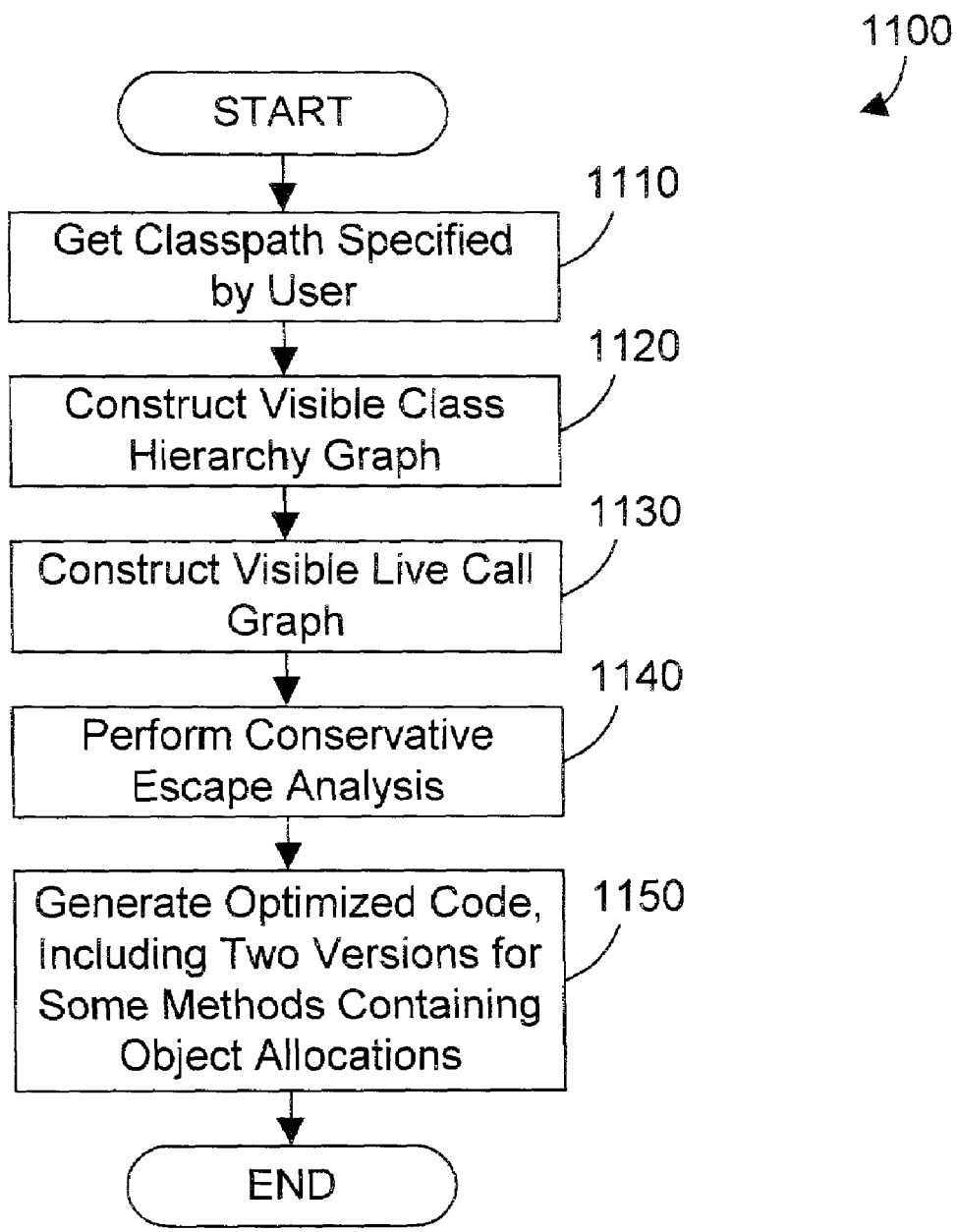
FIG. 11 is a flow diagram of a method in accordance with the preferred embodiments.

A method in accordance with the preferred embodiment that may be used in a partial compilation environment is shown as method 1100 of FIG. 11. We assume that the preferred embodiments operate in a partial compilation environment, which is defined herein to mean that the preferred embodiment works on less than all of the classes that are present in a computer program. One example of a partial compilation environment is when different compilation units are compiled separately and linked together after all have been individually compiled. Another example of a partial compilation environment is a Just-In-Time (JIT) compiler that compiles portions of a computer program as they are needed at run time without having access to the entire computer program. Yet another example of a partial compilation environment is compiling multiple Java Archive (JAR) files that make up a computer program.

Referring now to FIG. 11, the preferred embodiments include a method 1100 that allows compiling multiple JAR files by getting a classpath from a user (step 110), where the classpath specifies one or many destinations wherein may be stored JAR files that make up a computer program. Note that this classpath may be empty, in which case no external classes from other compilation units will be analyzed, and therefore no dependencies on external classes will be created. Next, a class hierarchy graph is made of all classes actually present (visible) in the compilation unit (step 1120). If the classpath from step 1110 is not empty, the class hierarchy graph also includes classes in the classpath that are referenced, directly or indirectly, from the classes in the compilation unit. Note that step 1120 builds a class hierarchy graph for the visible classes in the same manner that prior art step 620 builds a class hierarchy graph for all of the classes in a computer program. The primary difference is that the class hierarchy graph in step 1120 only considers the visible classes. The prior art step 620, in contrast, would not be performed when less than all of the classes in a computer program are present in a compilation unit.

A live call graph is then constructed from the visible method calls in the compilation unit (step 1130). If the classpath from step 1110 is not empty, the live call graph also includes methods from classes in the classpath that may be called, directly or indirectly, from methods in the compilation unit. The live call graph shows which methods in the compilation unit may possibly call which other methods in the compilation unit at each call site. A major difference between the visible live call graph constructed in step 1130 of FIG. 11 and the prior art live call graph constructed in step 620 of FIG. 6 is that step 1130 of FIG. 11 assumes all methods in the compilation unit to be live. Step 620 of FIG. 6, in contrast, traces live methods from a "root set" of methods that can be called from outside the program. Because there are multiple compilation units in the preferred embodiments, assuming that all methods in the compilation unit to be live is a conservative assumption that will allow stack allocation of objects only if detailed criteria are met.

Figure 16:
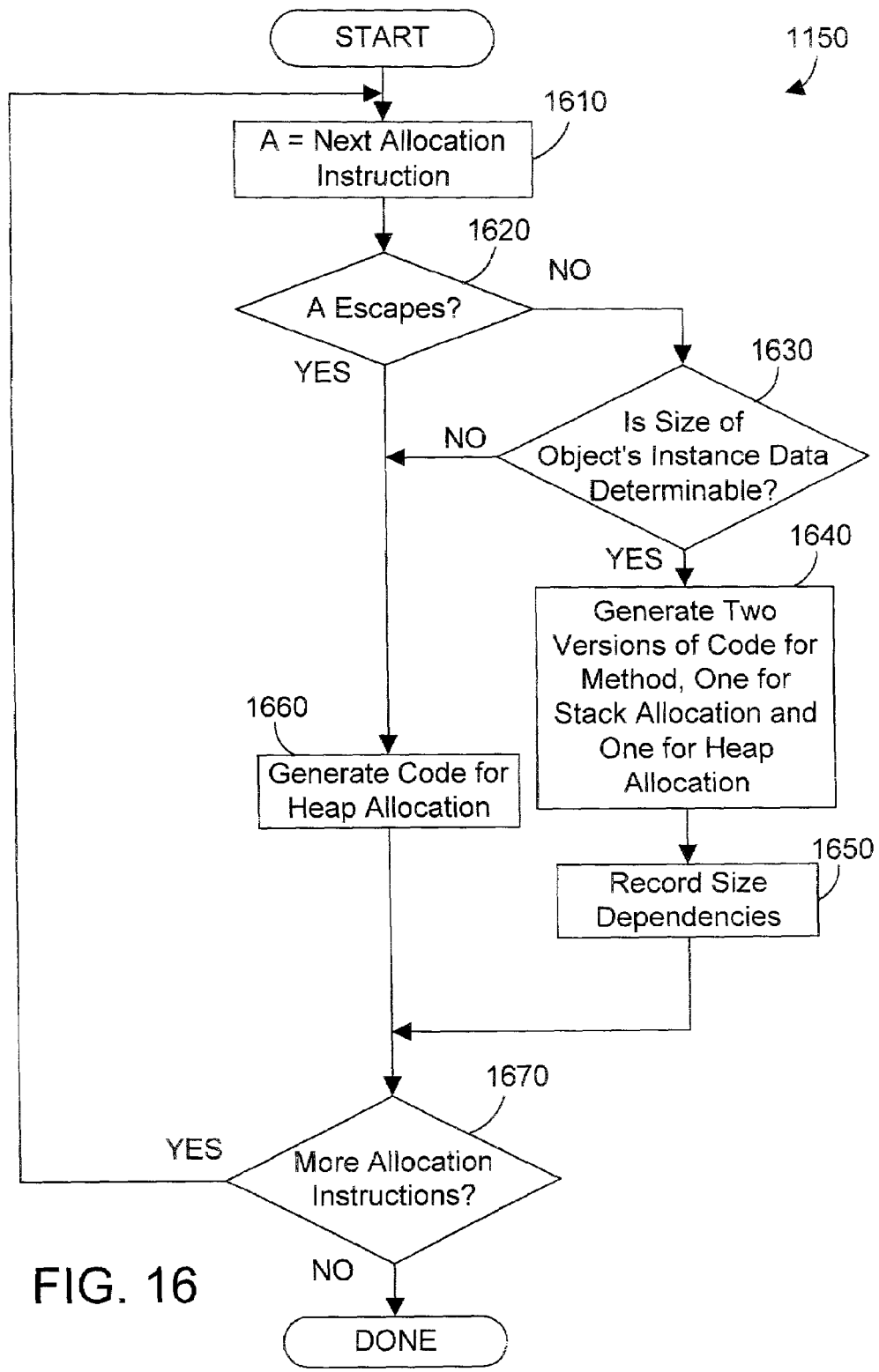
FIG. 16 is a flow diagram of one suitable method in accordance with the preferred embodiments for performing step 1150 of FIG. 11.

A modified, conservative form of escape analysis is then performed (step 1140) during which sub-portions of the live call graph are analyzed to determine whether the sub-graph is "final", i.e., whether the exact methods called are known at compile time. Once the escape analysis in step 1140 is performed, optimized code is generated in step 1150. Note that step 1150 may generate two versions of code for some methods containing object allocations, one version that allocates objects from the invocation stack frame, and another version that allocates objects from the heap. The appropriate version for the method will then be selected at run time. Details of the code generation in step 1150 are shown in FIG. 16.

Figure 12:
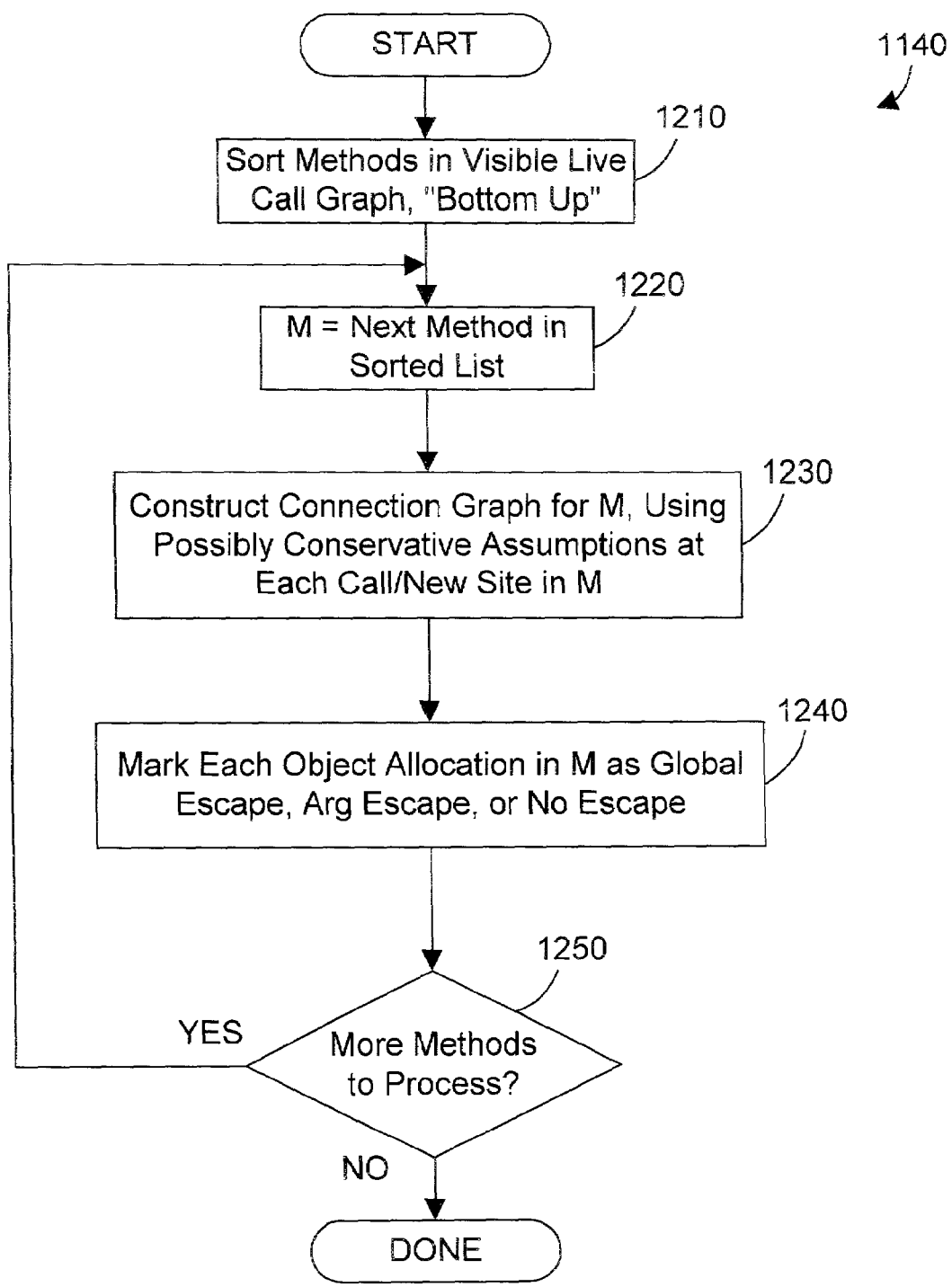
FIG. 12 is a flow diagram of one suitable method in accordance with the preferred embodiments for performing step 1140 of FIG. 11.

Details of step 1140 in FIG. 11 in accordance with the preferred embodiments are shown as method 1140 in FIG. 12. Note that method 1140 is similar to prior art method 630 shown in FIG. 7. The primary difference is that step 1230 in FIG. 12 constructs and analyzes a connection graph differently than step 730 of FIG. 7. Details of step 1230 that explain the difference between step 1230 and step 730 are shown in FIGS. 13–17 and the accompanying description below.

Figure 13:
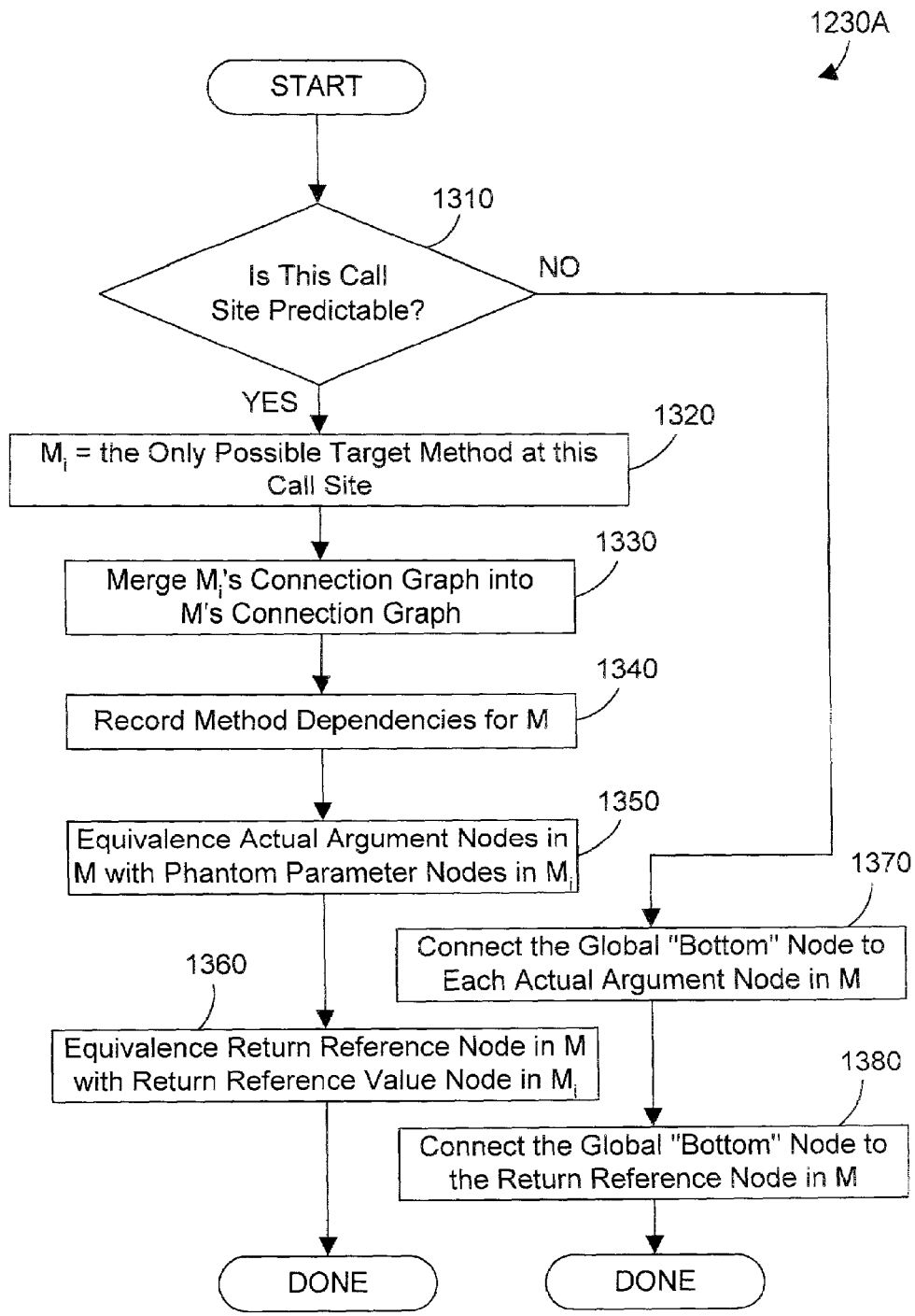
FIG. 13 is a flow diagram of one suitable method in accordance with the preferred embodiments that may be performed during step 1230 of FIG. 12.

One suitable way to process call sites during the escape analysis of step 1230 is shown as method 1230A in FIG. 13. The call site processing in method 1230A of FIG. 13 includes logic to account for the fact that not all classes are visible when the call sites in a single compilation unit are compiled. First, we determine whether the call site is predictable (step 1310). In the preferred embodiments, a call site is "predictable" if there is a single, known call target that cannot change at run time. The details of determining whether a call site is predictable are discussed below with respect to FIG. 14. If the call site is predictable (step 1310=YES), there is only one possible target method $M_1$ at this call site (step 1320). $M_1$'s connection graph is merged into M's connection graph (step 1330). Next, method dependencies are recorded for M (step 1340). Note that if any object allocations in M are to be stack-allocated, this decision depends on the analysis of $M_1$, as well as on any other method called from $M_1$. Thus with each method M we associate a list of methods on whose analysis M's analysis depends. In step 1340, the dependency list for method M is augmented by $M_1$, and by all methods in the dependency list associated with $M_1$. Next we equivalence actual argument nodes in M with phantom parameter nodes in $M_1$ (step 1350) and equivalence the return reference node in M with the return reference value in $M_1$ (step 1360), similar to steps 840 and 850 of FIG. 8.

If the call site is not predictable (step 1310=NO), we must make pessimistic assumptions about the called method, assuming that any parameters passed to it and object references returned from it globally escape. This is done by connecting the global "bottom" node to each actual argument in M (step 1370) and by connecting the global "bottom" node to the return reference node in M (step 1380). Escape analysis taught by Choi et al. causes any object allocation nodes reachable from the "bottom" node to be marked as global escape. By performing steps 1370 and 1380, we ensure that anything that might be passed to an unpredictable method will be marked as global escape.

Figure 14:
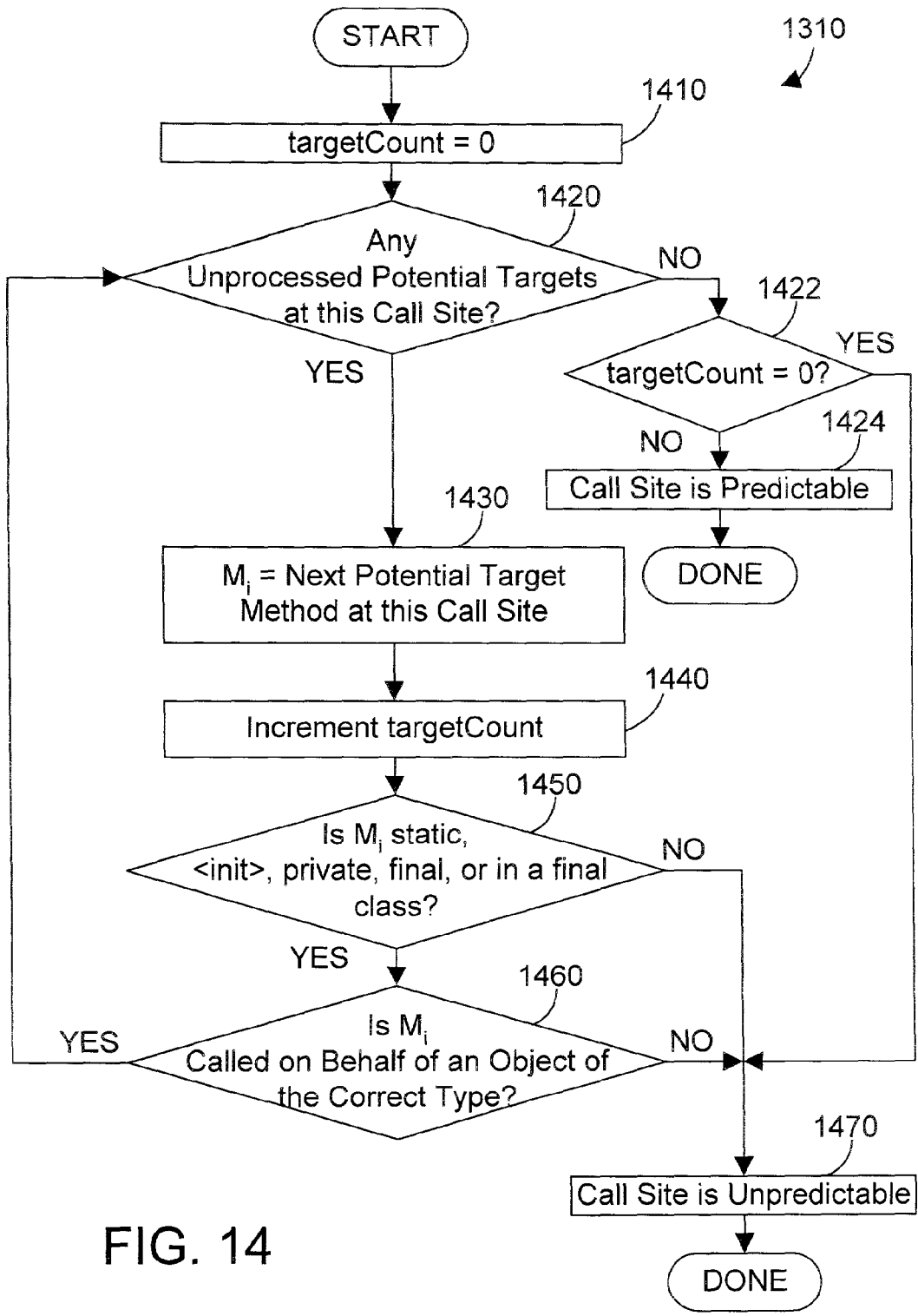
FIG. 14 is a flow diagram of one suitable method in accordance with the preferred embodiments for performing step 1310 of FIG. 13.

FIG. 14 shows the details of how a call site is determined to be predictable or not in step 1310 of FIG. 13. First, a variable called targetCount is initialized to zero (step 1410). Assuming there is one or more unprocessed potential target methods at this call site (step 1420=YES), $M_1$ is assigned to the next potential target method at this call site (step 1430), and targetCount is incremented (step 1440). We then determine whether $M_1$ is a predictable kind of method (step 1450). Examples of predictable methods include: static methods, <init> methods, private methods, final methods, or methods in a final class. If $M_1$ is not a predictable method (step 1450=NO), the call site is unpredictable (step 1470). If $M_1$ is a predictable method (step 1450=YES), we check to see if $M_1$ is called on behalf of an object of the correct type (step 1460), which is to say that we check to see if the call site refers to method $M_1$ using the exact class name. If $M_1$ is a virtual method call, the specific calling object will not be known (step 1460=NO), so the call site is unpredictable (step 1470). Once there are no unprocessed potential target methods at this call site (step 1420=NO), if targetCount equals zero (step 1422=YES), this means that no methods were processed, which means that the method call must be outside the set of visible classes. As a result, the call site is unpredictable (step 1470). If targetCount is non-zero (step 1422=NO), the call site is predictable (step 1424). Note that the steps in FIG. 14 make pessimistic assumptions by assuming that any call outside of the set of visible classes results in an unpredictable call site, which will be marked as global escape and will thus be heap allocated. The call site processing of the preferred embodiment is therefore very conservative, allocating objects to a method's invocation stack only when it can be sure that the method will not escape the lifetime of the object.

Figure 15:
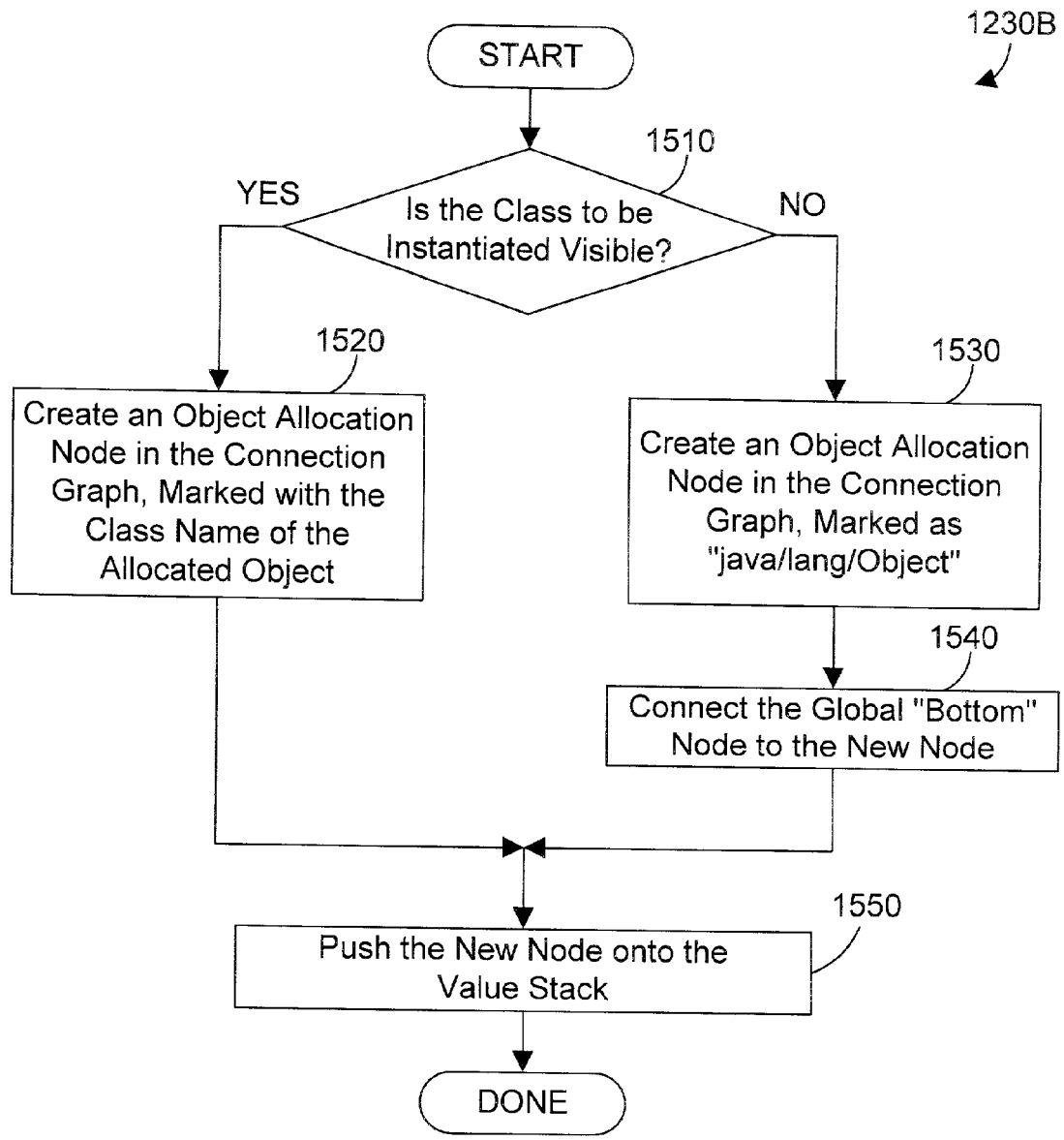
FIG. 15 is a flow diagram of one suitable method in accordance with the preferred embodiments that may be performed during step 1230 of FIG. 12.

The processing of object allocations in accordance with the preferred embodiments is shown as method 1230B in FIG. 15. First, we determine whether the class to be instantiated is in the set of visible classes (step 1510). If so, an object allocation node is created in the connection graph and is marked with the class name of the allocated object (step 1520). The new object allocation node is then pushed onto the value stack (step 1550). Note that steps 1520 and 1550 are preferably the same as steps 910 and 920 in the prior art method of Choi et al. shown in FIG. 9. If the class to be instantiated is not visible in the compilation unit (step 1510=NO), an object allocation nodes is created in the connection graph and is marked as "java/lang/Object" (step 1530). This is essentially a dummy object allocation node in the connection graph that is arbitrarily marked as "java/lang/Object". The global "bottom" node is then connected to the new node (step 1540), ensuring that neither the newly created node nor any object reachable from it will be considered for stack allocation, and the new node is pushed onto the value stack (step 1550).

One suitable implementation of step 1150 of FIG. 11 in accordance with the preferred embodiments is shown as method 1150 of FIG. 16. An allocation instruction is selected (step 1610). If the allocation instruction escapes (either global escape or arg escape) (step 1620=YES), code is generated for the method that uses heap allocation for objects allocated in the method (step 1660). If the allocation instruction is no escape (step 1620=NO), we then check to see if the size of the object's instance data is determinable (step 1630). If not (step 1630=NO), code is generated for heap allocation (step 1660). If the allocation instruction is no escape (step 1620=NO) and the size of the object's instance data is determinable (step 1630=YES), the method may use stack allocation. In the preferred embodiments, as shown in step 1640, two versions of code for the method may be generated, one for stack allocation and one for heap allocation. At run time, one of the two versions will be used, depending on whether the requisite external classes are then present. Note that no more than two versions will ever be generated; if the method contains any stack allocation opportunities, one version will use stack allocation for all these allocation sites, while the other will use heap allocation for all of the allocation sites. Size dependencies for the method are then recorded (step 1650). If a class being allocated has an external superclass (other than java/lang/Object) known at compile time, the size of the object at run time may change if a different version of the superclass is loaded. Thus, a size dependency is recorded with the code for the method. The size dependency includes the size of the instance data for the object determined at compile time. The size of the instance data at compile time can then be compared to the size of the instance data at run time to ensure that the instantiated class has the same size as was detected at compile time. If there are more allocation instructions to process (step 1670=YES), control is returned to step 1610 and processing continues until there are no more allocation instructions to process (step 1670=NO).

Assuming that two versions of a method were created in step 1640 of FIG. 16 (one for stack allocation, the other for heap allocation), we now must determine which version of the method to use at run time. Note that if only one version of the method was created, the steps of FIG. 17 do not apply and need not be performed. The steps to make this decision are shown as method 1700 in FIG. 17. First, a class denoted C is loaded (step 1710). Assuming there are methods in C to process (step 1720=YES), a method is selected and assigned to M (step 1730). If M does not depend on any other classes (step 1740=NO), the next method is selected for processing. The dependency information of M on its classes was stored in step 1340 of FIG. 13, so step 1740 of FIG. 17 simply retrieves this stored information to determine whether M has any dependencies on any other classes. Assuming that M depends on one or more other classes (step 1740=YES), one of the classes on which M depends is selected and assigned to D (step 1750). Class D is then loaded, if needed (step 1760). The method and size dependencies of class D are then compared to the stored method dependencies and size dependencies for method M. The stored information about class D is intended to ensure that the version of class D seen at run time is the same class D as was seen at compile time. In the preferred embodiments, this information includes the last-modification timestamp for the class, and a checksum calculated over the body of the class such that a change to the class is highly unlikely to result in the same checksum value. If the run time values of these data match the stored values calculated at compile time, then the method dependency for class D is satisfied. Size dependencies are satisfied merely by comparing the run time size of a class's objects with the assumed size at compile time.

After all classes that M depends on have been processed (step 1740=NO), a decision is made as to which version of M is to be called at run time (step 1780). If any single method or size dependency checked in step 1770 was found to not be satisfied, then M's code pointer is set to the version of M that uses heap allocation. Otherwise. M's code pointer is set to the version of M that uses stack allocation.

Providing two different versions of a method, then dynamically selecting which method to use at run time offers a significant advantage over the prior art. Rather than assuming no stack allocation in a partial compilation environment, the preferred embodiments incorporate more intelligence into the decision, and even wait until run time to determine whether stack allocation is possible instead of blindly assuming that stack allocation is not possible due to the possibility of loading a different superclass.

Figure 18:
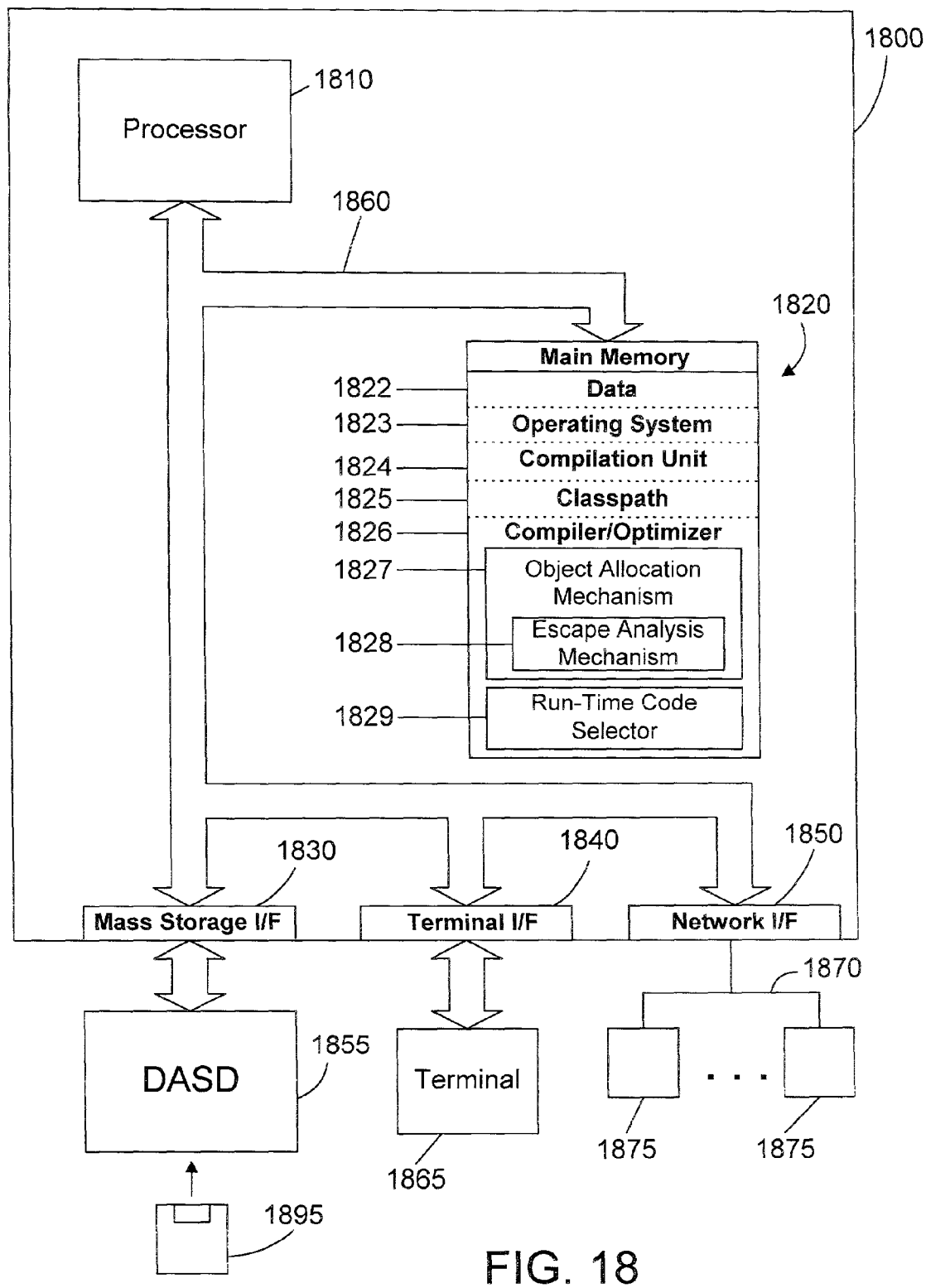
FIG. 18 is a block diagram of an apparatus in accordance with the preferred embodiments.

While the invention thus far has been described as computer-implemented methods, the invention could also be practiced as an apparatus that performs the method steps previously discussed. Referring to FIG. 18, a computer system 1800 in accordance with the preferred embodiment is an IBM iSeries computer system. However, those skilled in the art will appreciate that the mechanisms and apparatus of the present invention apply equally to any computer system, regardless of whether the computer system is a complicated multi-user computing apparatus. a single user workstation, or an embedded control system. As shown in FIG. 18, computer system 1800 comprises a processor 1810, a main memory 1820, a mass storage interface 1830, a terminal interface 1840, and a network interface 1850. These system components are interconnected through the use of a system bus 1860. Mass storage interface 1830 is used to connect mass storage devices (such as a direct access storage device 1855) to computer system 1800. One specific type of direct access storage device 1855 is a floppy disk drive, which may store data to and read data from a floppy disk 1895.

Main memory 1820 in accordance with the preferred embodiments contains data 1822, an operating system 1823, a compilation unit 1824 that makes up part of an object oriented or object-based program, a classpath 1825, and a compiler/optimizer 1826. Compiler/optimizer 1826 includes an object allocation mechanism 1827 and a run time code selector 1829. Object allocation mechanism 1827 includes an escape analysis mechanism 1828 that suitably performs the steps discussed in FIGS. 11–16 relating to escape analysis. Run time code selector 1829 suitably performs the steps of FIG. 17 to determine which of the two versions of a method to use at run time.

Computer system 1800 utilizes well known virtual addressing mechanisms that allow the programs of computer system 1800 to behave as if they only have access to a large, single storage entity instead of access to multiple, smaller storage entities such as main memory 1820 and DASD device 1855. Therefore, while data 1822, operating system 1823, compilation unit 1824, classpath 1825, and compiler/optimizer 1826 are shown to reside in main memory 1820, those skilled in the art will recognize that these items are not necessarily all completely contained in main memory 1820 at the same time. It should also be noted that the term "memory" is used herein to generically refer to the entire virtual memory of computer system 1800.

Data 1822 represents any data that serves as input to or output from any program in computer system 1800. Operating system 1823 is a multitasking operating system known in the industry as OS/400; however, those skilled in the art will appreciate that the spirit and scope of the present invention is not limited to any one operating system. Compilation unit 1824 is a collection of classes that are part of a computer program that is object oriented or object based, and contains one or more statements that instantiate (or create) objects. For the preferred embodiments, we assume that multiple compilation units make up an object oriented program, that compilation unit 1824 is one of the multiple compilation units, and that compiler/optimizer 1826 operates on a single compilation unit at a time. Classpath 1825 is a user-specified path that tells compiler/optimizer 1826 where to look for external classes expected to be present at run time. A classpath is an ordered list of directories and/or Java archive (JAR) files that may contain such classes.

Processor 1810 may be constructed from one or more microprocessors and/or integrated circuits. Processor 1810 executes program instructions stored in main memory 1820. Main memory 1820 stores programs and data that processor 1810 may access. When computer system 1800 starts up, processor 1810 initially executes the program instructions that make up operating system 1823. Operating system 1823 is a sophisticated program that manages the resources of computer system 1800. Some of these resources are processor 1810, main memory 1820, mass storage interface 1830, terminal interface 1840, network interface 1850, and system bus 1860.

Although computer system 1800 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 1810. However, those skilled in the art will appreciate that the present invention applies equally to computer systems that simply use I/O adapters to perform similar functions.

Terminal interface 1840 is used to directly connect one or more terminals 1865 to computer system 1800. These terminals 1865, which may be non-intelligent (i.e., dumb) terminals or fully programmable workstations, are used to allow system administrators and users to communicate with computer system 1800. Note, however, that while terminal interface 1840 is provided to support communication with one or more terminals 1865, computer system 1800 does not necessarily require a terminal 1865, because all needed interaction with users and other processes may occur via network interface 1850.

Network interface 1850 is used to connect other computer systems and/or workstations (e.g., 1875 in FIG. 18) to computer system 1800 across a network 1870. The present invention applies equally no matter how computer system 1800 may be connected to other computer systems and/or workstations, regardless of whether the network connection 1870 is made using present-day analog and/or digital techniques or via some networking mechanism of the future. In addition, many different network protocols can be used to implement a network. These protocols are specialized computer programs that allow computers to communicate across network 1870. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 1895 of FIG. 18) and CD ROM, and transmission type media such as digital and analog communications links.

An example is now presented to illustrate the function of the apparatus and method of the preferred embodiments. FIGS. 19A and 19B show C++ pseudo-code for nine sample classes that are assumed to be in a first compilation unit. These classes are: Instrument, Intensity, WindInstrument, Valve, BrassInstrument, WoodwindInstrument, Drumstick, Mallet, and Player. FIG. 20 shows C++ pseudo-code for three sample classes that are assumed to be in a second compilation unit that is compiled separately from the first compilation unit. Only those portions of the classes and methods germane to explaining the preferred embodiments are shown. An ellipsis ( . . . ) is occasionally used in FIGS. 19A, 19B and 20 to stand for code that doesn't matter for the purpose of illustrating the concepts of the preferred embodiments. We ignore hidden constructor chains for this example. Thus, if X extends Y, the fact that X.<init> calls Y.<init> is ignored for the sake of simplifying the example shown herein.

Figure 21:
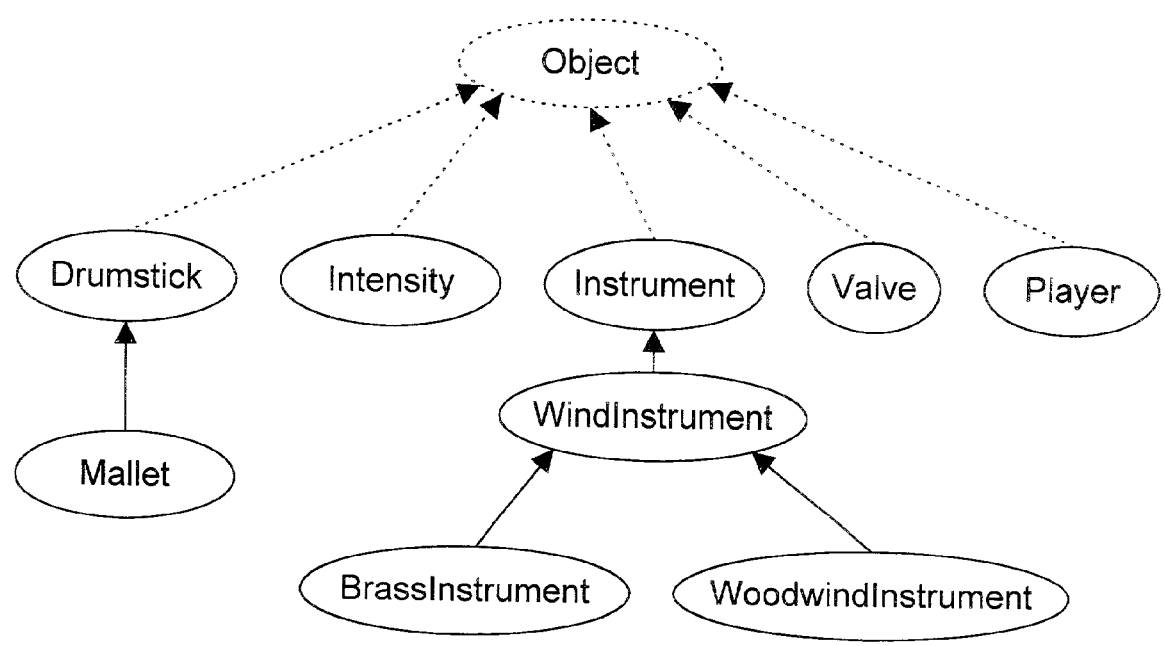
FIG. 21 is a class hierarchy graph for the pseudo-code in the first compilation unit shown in FIGS. 19A and 19B.
Figure 22:
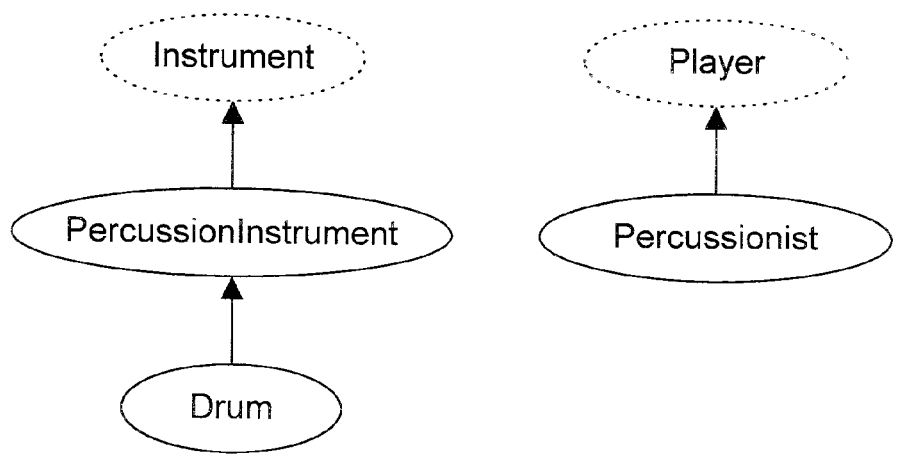
FIG. 22 is a class hierarchy graph for the pseudo-code in the second compilation unit shown in FIG. 20.

FIG. 21 shows the visible class hierarchy graph that would be constructed for the first compilation unit in step 1120 of FIG. 11. If a class X in the compilation unit extends a class Y not in the compilation unit, then Y is represented in these figures as a dashed oval, and the inheritance arc from X to Y is also dashed. The compiler has no knowledge about what classes Y might be inherited from. Step 1120 of FIG. 11 would also generate the visible class hierarchy graph for the second compilation unit as shown in FIG. 22.

Figure 23:
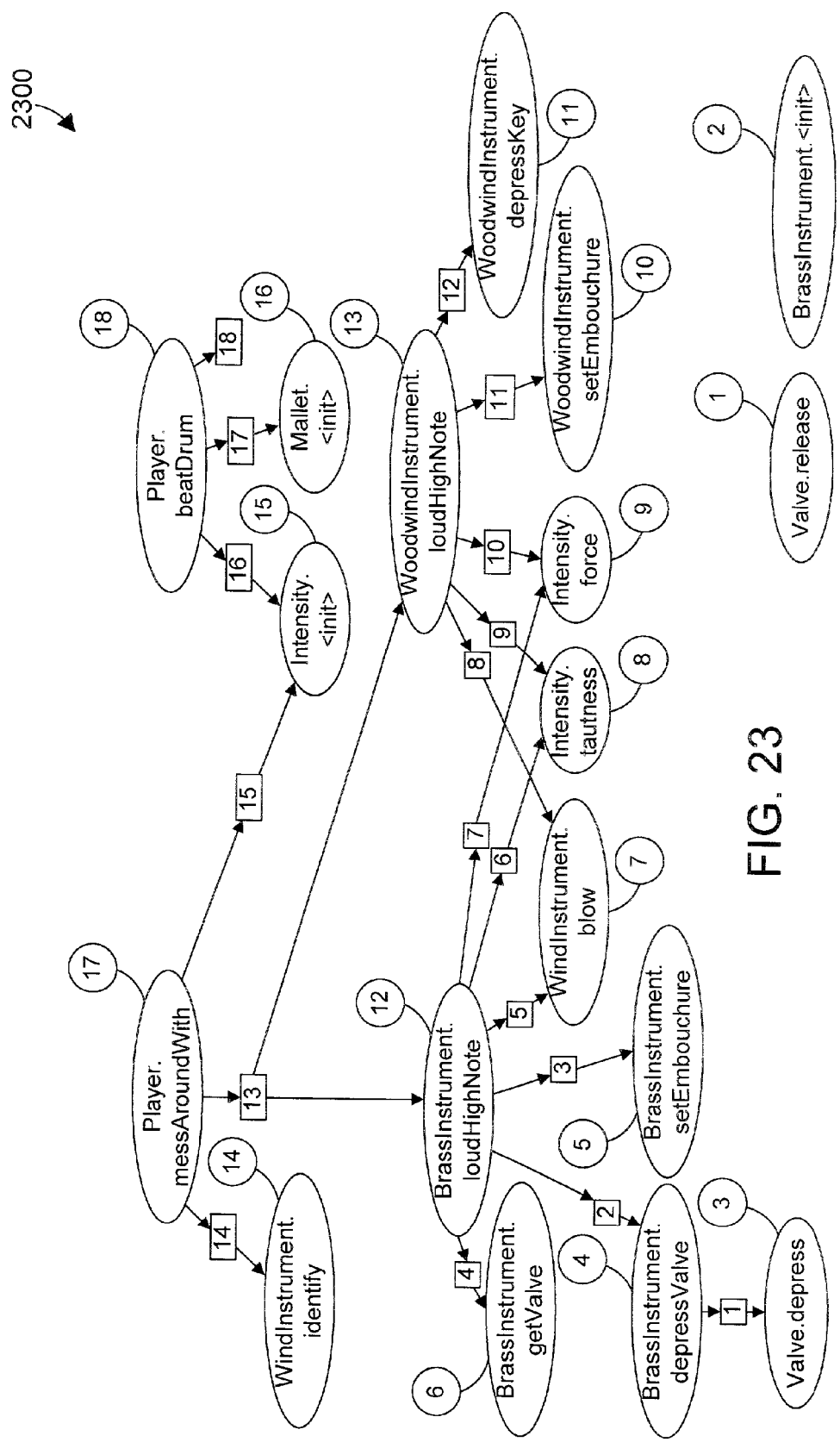
FIG. 23 is a live call graph for the pseudo-code in the first compilation unit shown in FIGS. 19A and 19B.
Figure 24:
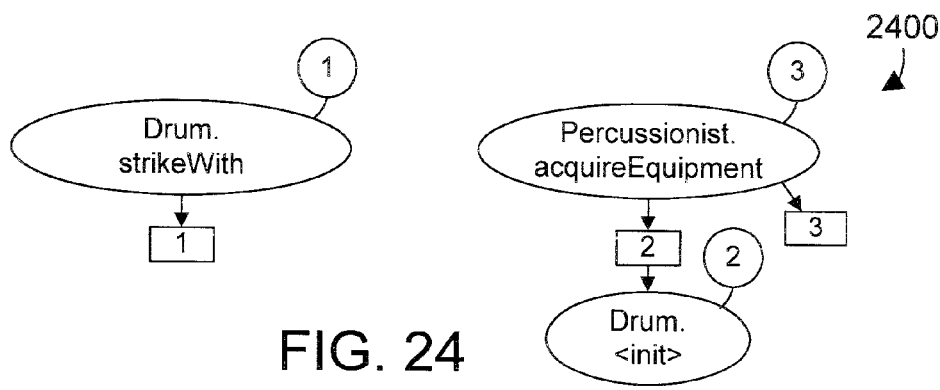
FIG. 24 is a live call graph for the pseudo-code in the second compilation unit shown in FIG. 20.

Step 1130 of FIG. 11 would construct the visible live call graph 2300 shown in FIG. 23 for the first compilation unit, and would construct the visible live call graph 2400 shown in FIG. 24 for the second compilation unit. An oval labeled X.Y indicates method Y in class X. If a method contains call sites, then there are arcs from the corresponding oval to one small square per call site. There are also arcs from the call site squares to each method in the compilation unit that might be invoked at that call site. Note that most call sites have only one outgoing arc, while others have zero or two (although any number is possible). A call site with zero outgoing arcs, such as call site 1 associated with Drum.strikeWith in FIG. 24, presumably can invoke one or more methods outside the compilation unit. In general, any call site might possibly invoke methods outside the compilation unit unless we can prove otherwise. An example of a true virtual method call is the second call site associated with Player.messAroundWith, which can invoke either BrassInstrument.loudHighNote or WoodwindInstrument.loudHighNote at call site 13, or possibly some other method outside the compilation unit, as shown by the visible live call graph in FIG. 23.

Step 1140 of FIG. 11 is shown in more detail in FIG. 12, where the first step is to sort the methods in the visible live call graph in a leaves to roots order. Each method in the live call graphs of FIGS. 23 and 24 has a circled ordinal number associated with it, defining its position in the sort order. We then process steps 1220, 1230 and 1240 of FIG. 12 for each of the methods in the compilation unit.

Figure 25A:
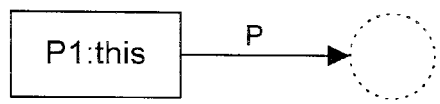
FIGS. 25A–25C each show a connection graph for listed methods for the pseudo-code of FIGS. 19A and 19B.

Rather than go through the steps tediously for each of these 21 methods defined in FIGS. 23 and 24, let's instead look at those methods and steps that have bearing on the invention as disclosed in the preferred embodiments herein. Some differences between the prior art and the preferred embodiments are in how the connection graph construction for a method is handled differently at call sites and object allocation sites. Therefore we need only concentrate on methods containing such sites. Processing of a call site is shown in FIGS. 13 and 14, while processing of an object allocation site is shown in FIG. 15. FIG. 25A shows connection graphs for the 11 methods in FIG. 23 that have no call sites or object allocation sites. In these connection graphs, a box represents a reference node (pointer), and a circle represent an object allocation node. A dashed circle represents an object allocated outside the current method. A reference node contains the name of the referencing variable, and may be preceded by "$P_i$:" to indicate that it is the ith formal parameter passed to the current method. An arc from a reference node to an object allocation node is marked "P" to indicate that the reference "points to" the allocated object. Thus, in the connection graph for BrassInstrument.getValve shown in FIG. 25C, the hidden "this" pointer is the first parameter, and is assumed to point to an object of type BrassInstrument. Such object has a "valves" field pointing to an object of type Valve[ ] (an array of Valve objects). For purposes of this example, we make no distinction between the array object and the objects contained in the array.

The connection graph in FIG. 25A for the listed 11 methods simply indicates that the "this" pointer points to an unknown object. The object is not referenced otherwise within the method.

Figure 25B:
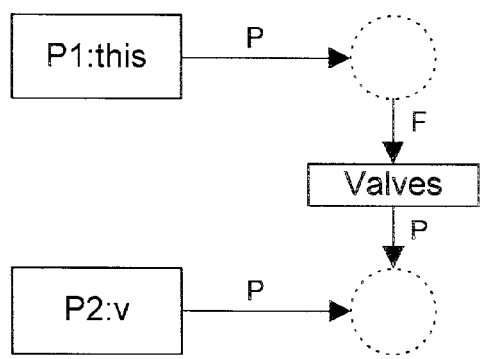

Referring to FIG. 25B, the connection graph for BrassInstrument.<init> (the compiler's internal name for the BrassInstrument constructor method) represents that the object pointed to by the "this" pointer will have its "valves" field modified to point to the second parameter ("v").

Figure 25C:
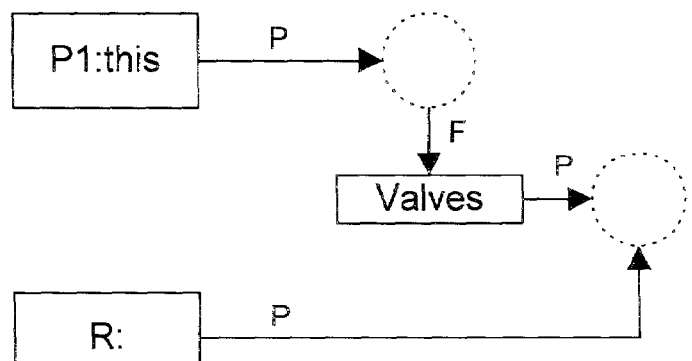
Figure 26A:
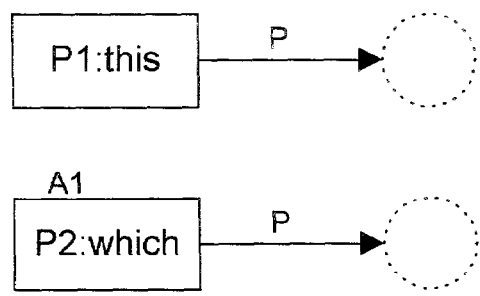
FIGS. 26A and 26B show a series of connection graphs generated during the processing of the BrassInstrument.depressValve method.
Figure 26B:
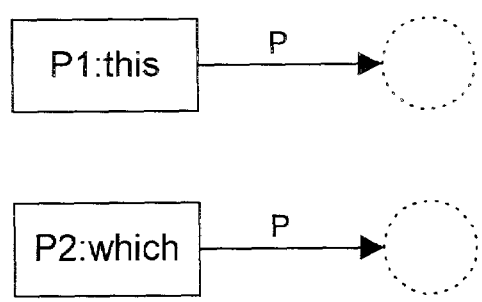

Referring to FIG. 25C, the connection graph for BrassInstrument.getValve represents that a reference to the object pointed to by "this.valves" will be returned. A reference node labeled "R:" is used to represent this temporary return value. With the connection graphs of FIGS. 25A–25C built as background, we now consider some of the remaining methods more carefully. FIGS. 26A and 26B show the processing that takes place for BrassInstrument.depressValve, which contains a call to Valve.depress. As discussed in Choi et al., a connection graph is built by processing statements in order. Prior to the call, the connection graph looks as shown in FIG. 26A, where the two parameters are assumed to point to objects. Note that the "which" parameter is annotated with "$A_1$" to indicate that it also represents the first argument to be passed to Valve.depress.

Since we desire to process a call site (namely, call site 1 in FIG. 23), we use method 1230A in FIG. 13. Step 1310, which is expanded in FIG. 14, determines whether this call site is predictable. Referring now to method 1310 of FIG. 14, in step 1410, targetCount is initialized to zero. Consulting the live call graph of FIG. 23, we see that the call site has one potential target, so step 1420=YES, and $M_1$ is set to Valve.depress in step 1430. Step 1440 then increments targetCount, resulting in targetCount=1. Consulting FIG. 19A, we see that Valve.depress is not static, is not <init>, is not private, and is not final. However, Valve.depress is a member of the final class Valve, so step 1450=YES). The call in the source code is on behalf of an object of type Valve, so step 1460=YES and we loop back to step 1420. There are no more potential targets at this call site, so step 1420=NO. TargetCount is one, so step 1422 is NO, and call site 1 is determined to be predictable (step 1424). As a result, step 1310=YES in FIG. 13 for this call site.

Referring to FIG. 13, step 1330 again sets $M_1$ to Valve.depress. At step 1330 we merge the connection graph of Valve.depress into the connection graph for BrassInstrument.depressValve. Since the Valve class is present in the compilation unit, it will be definitely be present at run time, so no method dependencies need to be recorded in step 1340. The actual argument $A_1$=which is equivalenced with the formal parameter $P_1$ of Valve.depress's connection graph (step 1350). There is no return reference node in Valve.depress, so step 1360 has no effect. Step 1350 results in no change to the caller's graph, and there are no more statements in BrassInstrument.depressValve, so step 1230 of FIG. 12 is complete with the final connection graph is as shown in FIG. 26B. Next, step 1240 of FIG. 12 determines that there are no object allocation sites in BrassInstrument.depressValve. There are still more methods to process (step 1250), so we loop back to step 1220, which selects the next method in the sorted list. Referring to FIG. 23, the next method in the sorted order is the BrassInstrument.setEmbouchure method.

Figure 27A:
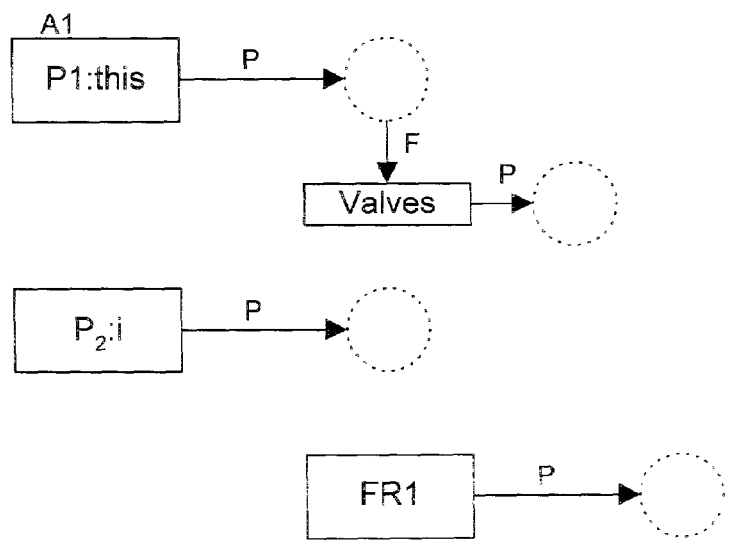
FIGS. 27A–27C show a series of connection graphs generated during the processing of the BrassInstrument.loudHighNote method.
Figure 27B:
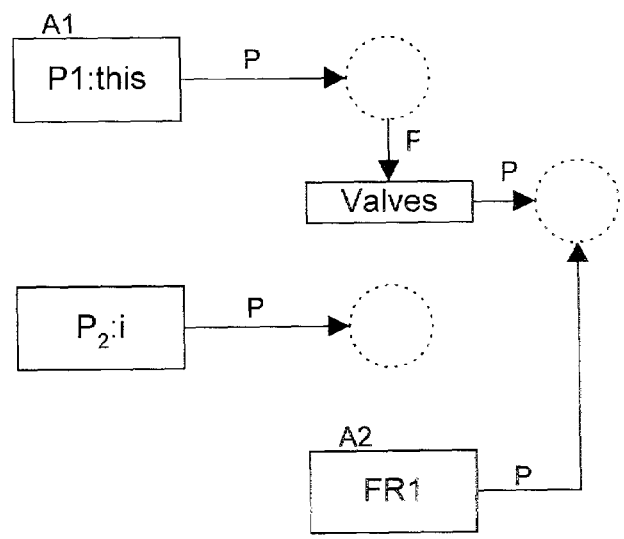
Figure 27C:
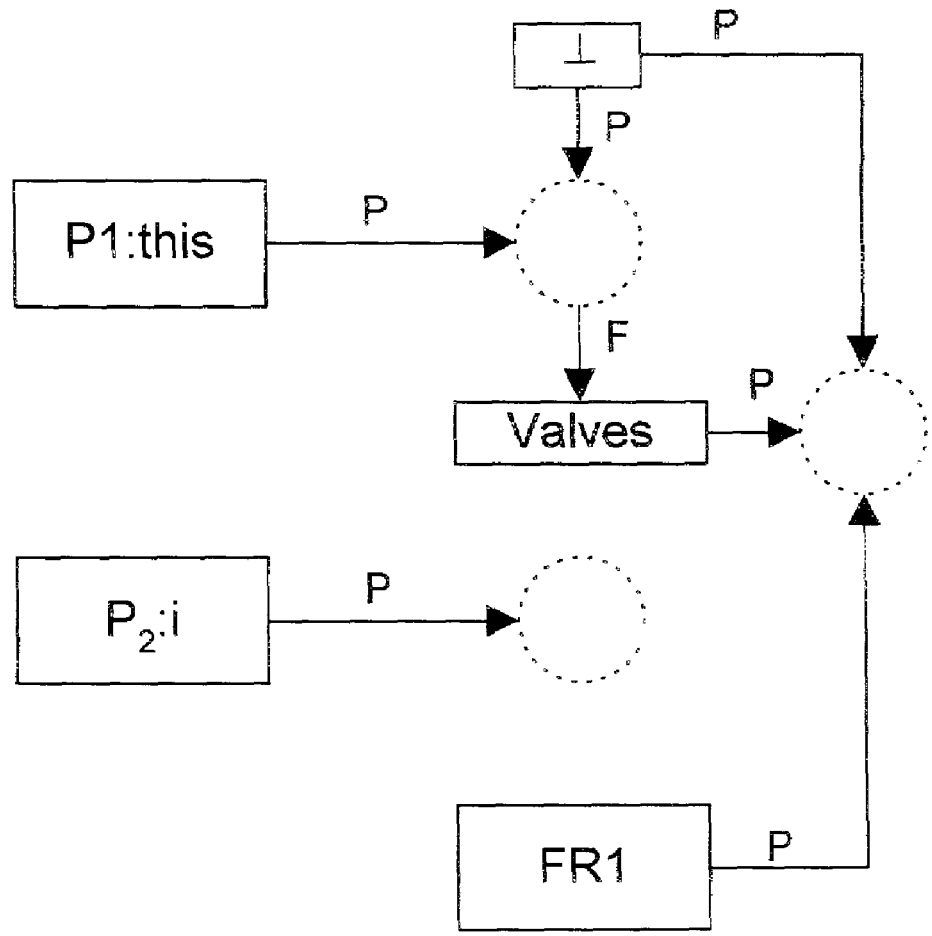

FIGS. 27A–27C show the connection graph during some of the processing for BrassInstrument.loudHighNote, which contains six method calls. The first of these is a call site 4 to BrassInstrument.getValve. FIG. 27A shows the connection graph prior to this call. As before, this shows the parameters pointing to unknown objects. In addition, there is an anonymous reference to the function result (shown as $FR_1$) to be returned from BrassInstrument.getValve. In step 1310 of FIG. 13, we must determine if this call site 4 is predictable by performing the steps in FIG. 14. The targetCount variable is initialized to zero (step 1410). Inspection of the live call graph of FIG. 23 shows that this call site 4 has one known target in the compilation unit, so step 1420=YES and step 1430 sets $M_1$ to this target method, namely BrassInstrument- .getValve. Step 1440 increments targetCount to a value of one. BrassInstrument.getValve is a private method (see FIG. 19A), so step 1450=YES. The call to getValve is done on behalf of a BrassInstrument object (namely, "this" of BrassInstrument.loudHighNote), so step 1460=YES. There are no more unprocessed potential targets at this call site 4 (step 1420=NO), and targetCount is nonzero (step 1422=NO), so the call site 4 is predictable (step 1424). Step 1320 then sets $M_1$ to BrassInstrument.getValve. Referring to FIG. 25C, the "this" parameter of BrassInstrument.getValve is equivalenced with the "this" parameter of BrassInstrument.loudHighNote from FIG. 27A (step 1350), and the formal return value of BrassInstrument.getValve is equivalenced with the anonymous "$FR_1$" reference node of BrassInstrument.loudHighNote (step 1360). The resulting connection graph is shown in FIG. 27B.

The next call site is call site 2 to BrassInstrument.depressValve, passing "this" and "$FR_1$" as arguments. In step 1310 we must check to see if call site 2 is predictable. Referring to FIG. 14, step 1410 initializes targetCount to zero. Inspection of the live call graph of FIG. 23 shows that call site 2 has one known target in the compilation unit, so step 1420=YES and step 1430 sets $M_1$ to this target, namely BrassInstrument.depressValve. Step 1440 increments targetCount to a value of one. BrassInstrument.depressValve is not static, <init>, private, final, or in a final class, so step 1450=NO, and call site 2 is unpredictable (step 1470). Because the call site is unpredictable (step 1310=NO), the global "bottom" node is created for BrassInstrument.loudHighNote and is connected to the objects pointed to by actual argument nodes "this" and "$FR_1$" as shown in FIG. 27C. Intuitively, the result is that the first argument passed by any caller to loudHighNote is assumed to escape, along with its "valves" subobject, because BrassInstrument.depressValve might be overridden at run time by a method that stores those objects in a global variable. There is no return reference node since this is a method returning void, so step 1380 has no effect.

The remaining calls in BrassInstrument.loudHighNote are all predictable, and target methods with the simple connection graph of FIG. 25A. As a result, the final connection graph for BrassInstrument.loudHighNote is as shown in FIG. 27C. There are no object allocations to be handled by step 1240, so we proceed to the next method.

Figure 28D:
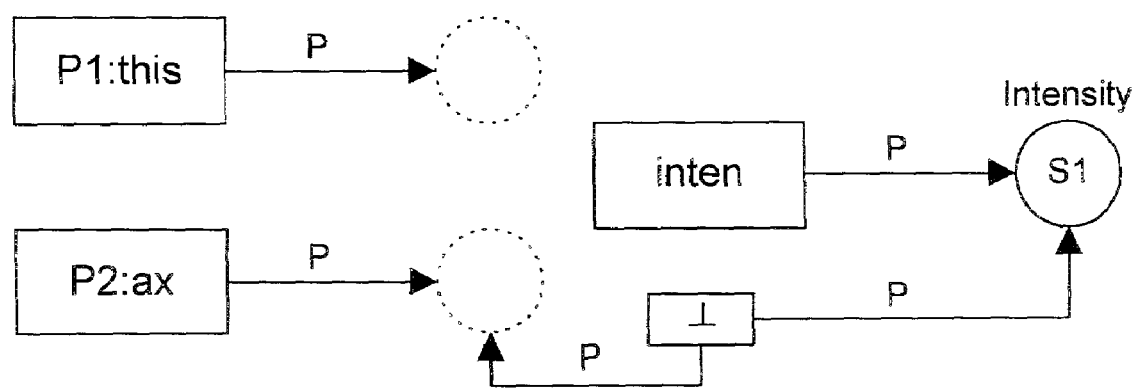

The connection graphs that result from processing method Player.messAroundWith is shown in FIGS. 28A–28D. First we choose call site 14 for processing. Before the call to Instrument.identify, the connection graph is as shown in FIG. 28A. Step 1410 sets targetCount to zero. Referring to FIG. 23, this call site has a single known target in the compilation unit, so step 1420=YES, and step 1430 assigns $M_1$ to WindInstrument.identify. Step 1440 increments targetCount to a value of one. Referring to FIG. 19A, WindInstrument.identify is a final method (step 1450=YES), but the call is performed on behalf of an Instrument object, not necessarily a WindInstrument object, so step 1460=NO and the call site is unpredictable (step 1470). Because the call site is unpredictable (step 1310=NO), a global "bottom" node is created and connected to the object pointed to by the actual argument ("ax").

The next statement S1 in Player.messAroundWith contains an object allocation statement, so we perform the steps in FIG. 15. The class to be instantiated is Intensity, which is present in the compilation unit, so step 1510=YES. An object allocation node for an Intensity object (shown as S1 in FIG. 28B) is created in the connection graph in step 1520. Step 1550 then pushes a reference to this object onto the value stack. The next bytecode processed will be a store of the reference on top of the stack to the reference variable "inten", causing the points-to arc to be added from "inten" to "S1". The result to this point is shown in FIG. 28B.

Next, we process a call to Intensity.<init> to initialize the newly created object, represented as call site 15. In reality this call precedes the store to "inten", but it simplifies the figures to assume the call to Intensity.<init> comes after the store to "inten". Referring to FIG. 14, step 1410 sets targetCount to zero. Inspection of the live call graph of FIG. 23 shows that call site 15 has one target, so step 1420=YES and step 1430 assigns $M_1$ to Intensity.<init>. Step 1440 increments targetCount to a value of one. Intensity.<init> is an <init> method, so step 1450=YES. The call is made on behalf of an Intensity object, so step 1460=YES. Step 1420 is now NO, as is step 1422, so the call site is predictable (step 1424), so step 1310 in FIG. 13 is YES. $M_1$ is assigned to Intensity.<init>, but steps 1330 and 1350 result in no changes to the connection graph, which is shown in FIG. 28C, which also shows that "ax" and "inten" are the arguments to be passed to Instrument.loudHighNote in the next statement at call site 13 of FIG. 23.

We now process call site 13 using the steps in FIGS. 13 and 14. First, targetCount is initialized to zero (step 1410). The live call graph shows two known targets of call site 13, so step 1420=YES, and step 1430 sets $M_1$ to the first of them, namely BrassInstrument.loudHighNote. Step 1440 increments targetCount to a value of one. BrassInstrument.loudHighNote is not static, <init>, private, final, or in a final class, so step 1450=NO and call site 13 is unpredictable (step 1470). As a result, step 1310=NO, so step 1370 connects a global "bottom" node to the objects pointed to by the actual arguments "ax" and "inten". Step 1380 has no effect since the call returns void. The final connection graph for Player.messAroundWith is shown in FIG. 28D. Returning to FIG. 12, step 1240 does an escape analysis (similar to Choi et al.) to determine whether object allocation node S1 escapes. Since it is reachable along a points-to path from the bottom node, it is marked global escape in step 1240.

Figure 29A:
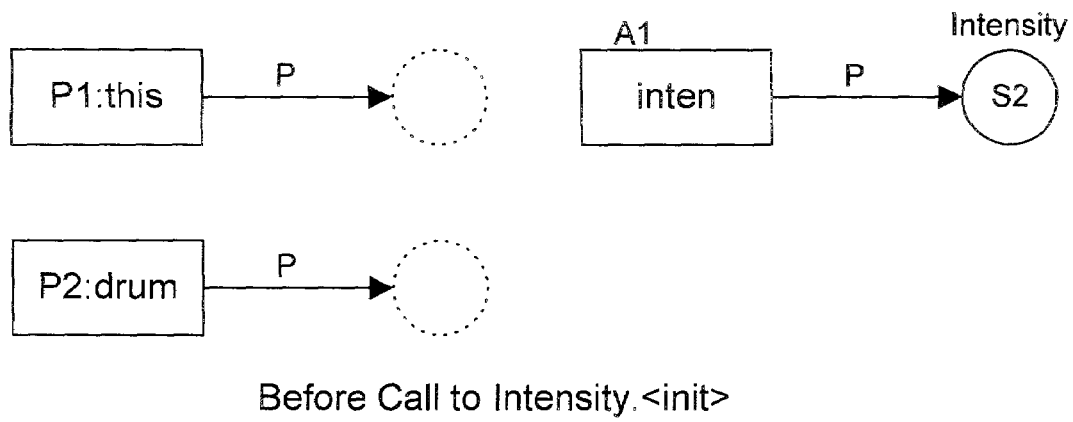
FIGS. 29A–29D show a series of connection graphs generated during the processing of the Player.beatDrum method.
Figure 29B:
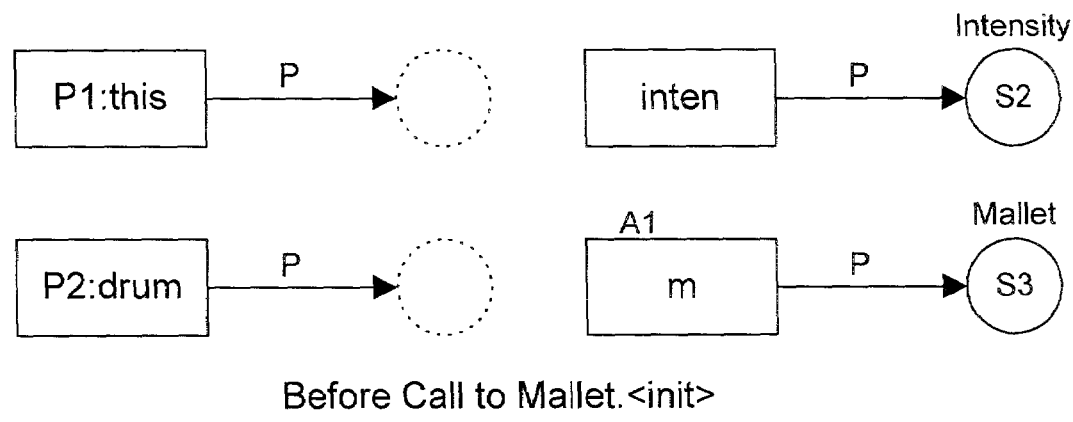
Figure 29C:
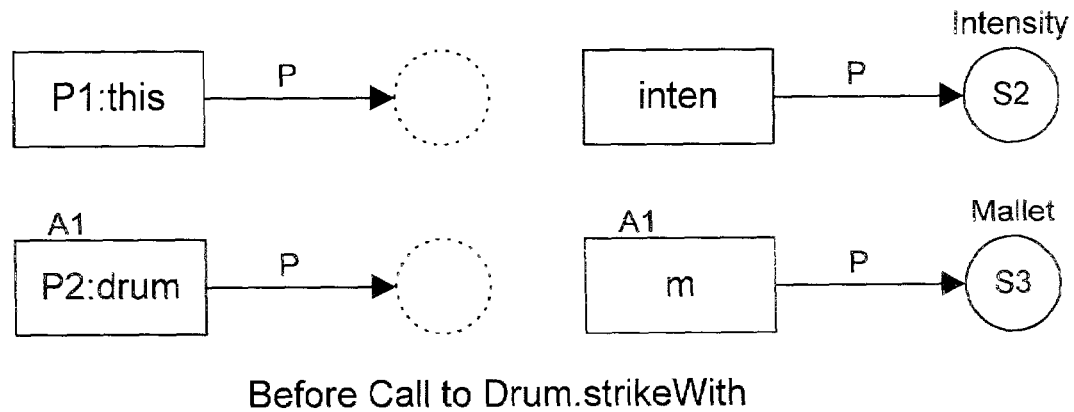
Figure 29D:
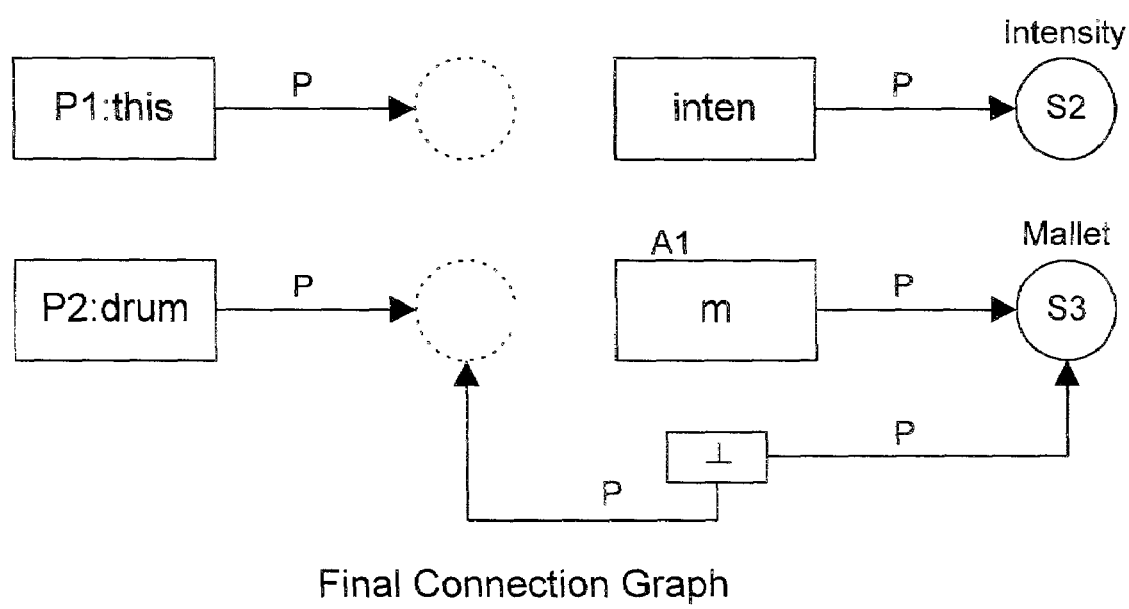

FIGS. 29A–D shows similar processing for call site 16 for Player.beatDrum. Processing of statements S2 and S3 results in the steps shown in FIGS. 29A–29C. Both allocated objects are of classes present in the compilation unit (step 1510=YES), so step 1520 creates an object allocation node in the connection graph, and step 1550 pushes the new node onto the value stack. When processing the call to Drum.strikeWith shown as call site 18 in FIG. 23, the connection graph initially looks like FIG. 29C. Now processing call site 18 of FIG. 23, step 1410 initializes targetCount to zero. From the live call graph in FIG. 23, there are no known target methods in the compilation unit for this call site, so step 1420=NO and step 1422=YES, so the call site is unpredictable (step 1470). The result is step 1310=NO, so the global "bottom" node is created and connected to the objects pointed to by the actual arguments "drum" and "m". The result is shown in FIG. 29D. Returning to FIG. 12, step 1240 must process the object allocation nodes S2 and S3. S3 is again reachable from the "bottom" node, so it is marked as global escape. S2 is not reachable from the "bottom" node or from any formal parameter, so S2 is marked as no escape and may safely be stack allocated even though it calls another method that is not predictable, since no reference to the stack allocatable object is passed to the unpredictable method. This demonstrates the utility of the invention as described in the preferred embodiments.

Turning now to the second compilation unit, we process Percussionist.acquireEquipment, as shown in FIGS.

30A–30C. The first statement contains an object allocation for a Drum object. Step 1510=YES in FIG. 15 because the Drum class is defined in the same compilation unit, so processing in steps 1520 and 1550 is as before, with the result shown in FIG. 30A. The call to the empty default constructor Drum.<init> is predictable and has no effect on the connection graph. Next, a Mallet object is allocated in statement S5. Step 1510=NO in FIG. 15 because the Mallet class is defined outside the compilation unit, so an object allocation node marked "java/lang/Object" ("Object" for short in FIG. 30B) is created in step 1530, and the global "bottom" node is created and connected to the new node in step 1540. Step 1550 pushes the new node on the value stack, so that later we connect node "m" to the new node "S5". The result prior to the call to Mallet.<init> is shown in FIG. 30B.

We now process the call site 3 to Mallet.<init>, shown in FIG. 24. Referring again to FIG. 14, step 1410 sets targetCount to zero. There are no known target methods for this call site, so step 1420=NO and step 1422=YES, so the call site is unpredictable (step 1470). The result is that step 1310=NO, so step 1370 connects the bottom node to those things pointed to by "m", which in this case has no effect on the connection graph. The final graph is shown in FIG. 30C. Returning to FIG. 12, S4 and S5 must be processed in step 1240. S5 is global escape because it can be reached from the bottom node. S4 is no escape, and therefore can be allocated on the stack, again despite the fact that Percussionist.acquireEquipment calls an unknown method.

In the foregoing examples, a single compilation unit was optimized without benefit of analyzing external classes. The following example demonstrates the additional utility of this aspect of the invention. In this case, the second compilation unit of FIG. 20 will again be compiled, but this time the user-defined classpath consists of a single JAR file containing the classes in the first compilation unit shown in FIGS. 19A and 19B.

Figure 31:
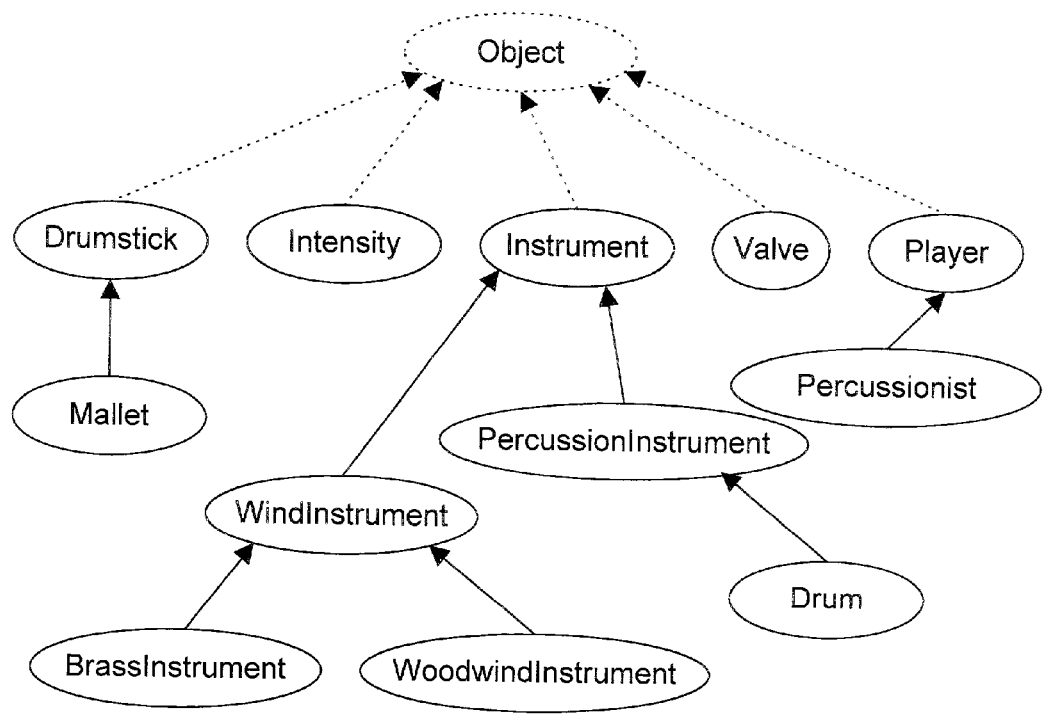
FIG. 31 is a class hierarchy graph for the pseudo-code in the second compilation unit shown in FIG. 20 when the first compilation unit in FIGS. 19A and 19B is in a specified classpath.
Figure 32:
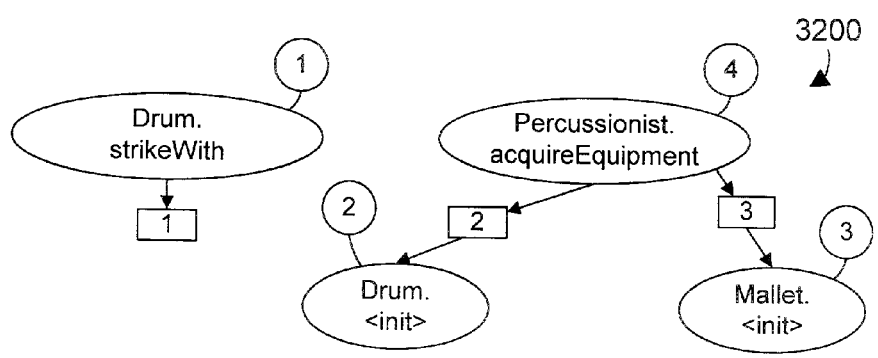
FIG. 32 is a live call graph for the pseudo-code in the second compilation unit shown in FIG. 20 when the first compilation unit in FIGS. 19A and 19B is in a specified classpath.

Referring again to FIG. 11, the classpath containing the first compilation unit is obtained in step 1110. In step 1120, the visible class hierarchy graph of FIG. 31 is constructed. Note that not only the classes defined in FIG. 20 are included, but also those classes that are referenced directly or indirectly from those classes. In step 1130, the visible live call graph of FIG. 32 is constructed. This looks very similar to the visible live call graph of FIG. 24, with one exception: call site 3 in Percussionist.acquireEquipment now has a visible target method, namely Mallet.<init>.

Conservative escape analysis is now performed by step 1140, as shown in FIG. 12. A sorted processing order for the methods of FIG. 32 is obtained (step 1210). Step 1220 then processes these methods one at a time. Processing for Drum.strikeWith and Drum.<init> proceeds exactly as in the previous example. In the next iteration of the loop, M is set to Mallet.<init> (step 1220). The connection graph for Mallet.<init> is constructed (step 1230), as shown in FIG. 25A. Mallet.<init> contains no object allocations, so step 1240 has no effect. There are more methods to process (step 1250=YES), so M is set to Percussionist.acquireEquipment (step 1220). The instructions of this method are then processed to produce a connection graph for M, as follows.

Figure 30A:
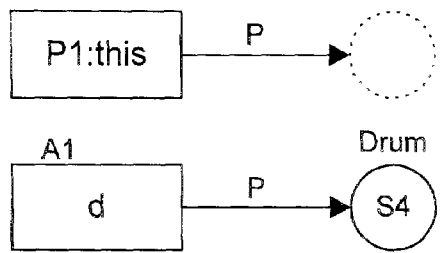
FIGS. 30A–30C show a series of connection graphs generated during the processing of the Percussionist.acquireEquipment method.
Figure 30B:
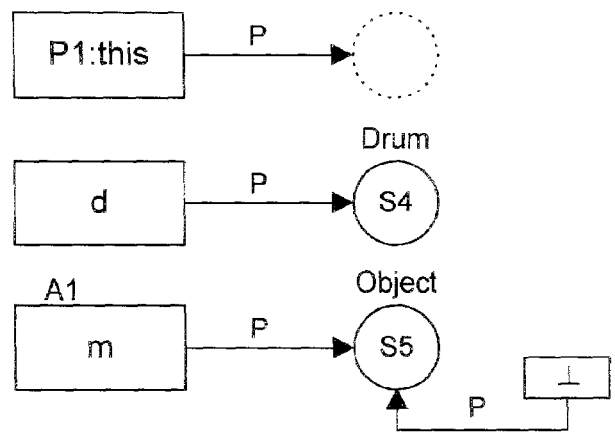
Figure 30C:
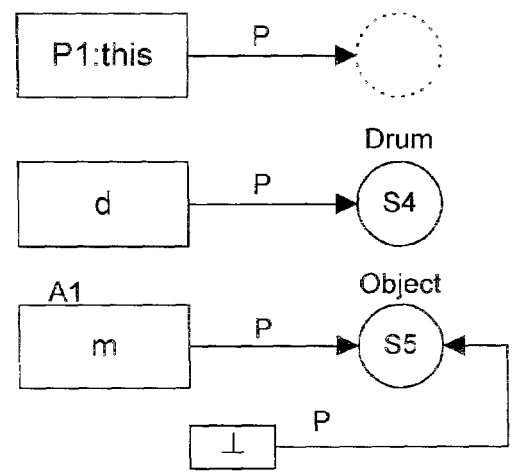
Figure 33A:
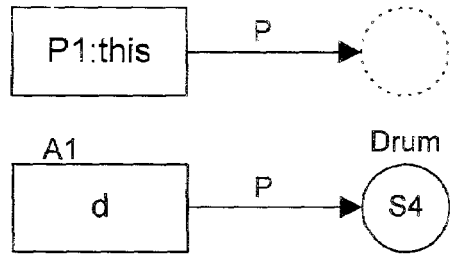
FIGS. 33A–33C show a series of connection graphs generated during the processing of the Percussionist.acquireEquipment method.
Figure 33B:
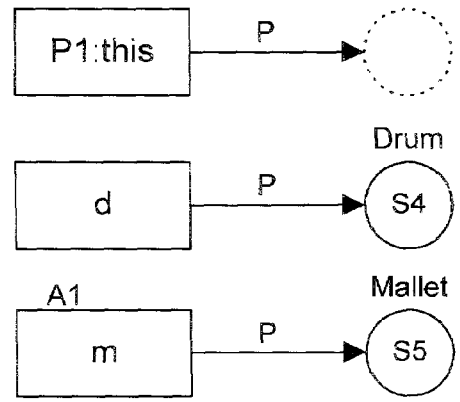

FIG. 33A, which is identical to FIG. 30A from the previous example, shows the connection graph for Percussionist.acquireEquipment prior to the call to Drum.<init>. The call to the empty default constructor Drum.<init> is predictable and has no effect on the connection graph. Next, a Mallet object is allocated in statement S5. In contrast to the previous example, Mallet is visible in a compilation unit in the classpath, so step 1510=YES. An object allocation node for S5 is created and labeled "Mallet" (step 1520) and a new node is pushed on the value stack (step 1550), so that later we connect node "m" to the new node "S5". The result prior to the call to Mallet.<init> is shown in FIG. 33B.

Figure 33C:
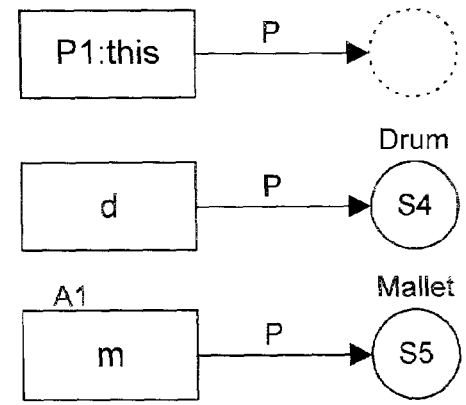

Next we process the call site 3 to Mallet.<init>, shown in FIG. 32. Referring again to FIG. 14, step 1410 sets targetCount to zero. This time there are known targets (step 1420=YES), so $M_1$ is set to Mallet.<init> (step 1430), and targetCount is incremented to a value of one (step 1440). This is an<init> method (step 1450=YES), the object being initialized is a Mallet (step 1460=YES), there are no other targets (step 1420=NO), and targetCount is not zero (step 1422=NO), so the call site is predictable (step 1424). Thus, step 1310=YES, and the trivial connection graph for Mallet.<init> is merged into the connection graph for Percussionist.acquireEquipment (step 1330). In step 1340, we record the timestamp and checksum of the Mallet class in the method dependency list for Percussionist.acquireEquipment. Equivalencing nodes in step 1350 and 1360 has no effect on the final connection graph, which is shown in FIG. 33C.

Returning to FIG. 12, step 1240 then determines which object allocations in Percussionist.acquireEquipment should be marked as global escape, arg escape, or no escape, as detailed in FIG. 16. Both allocations S4 and S5 are discovered to not escape, and to have a size that can be determined at compile time, so step 1640 determines that two code versions will be generated for this method, and step 1650 records the expected sizes of the Drum and Mallet objects in the size dependency list for Percussionist.acquireEquipment. This ends the compile time processing for this compilation unit.

Figure 17:
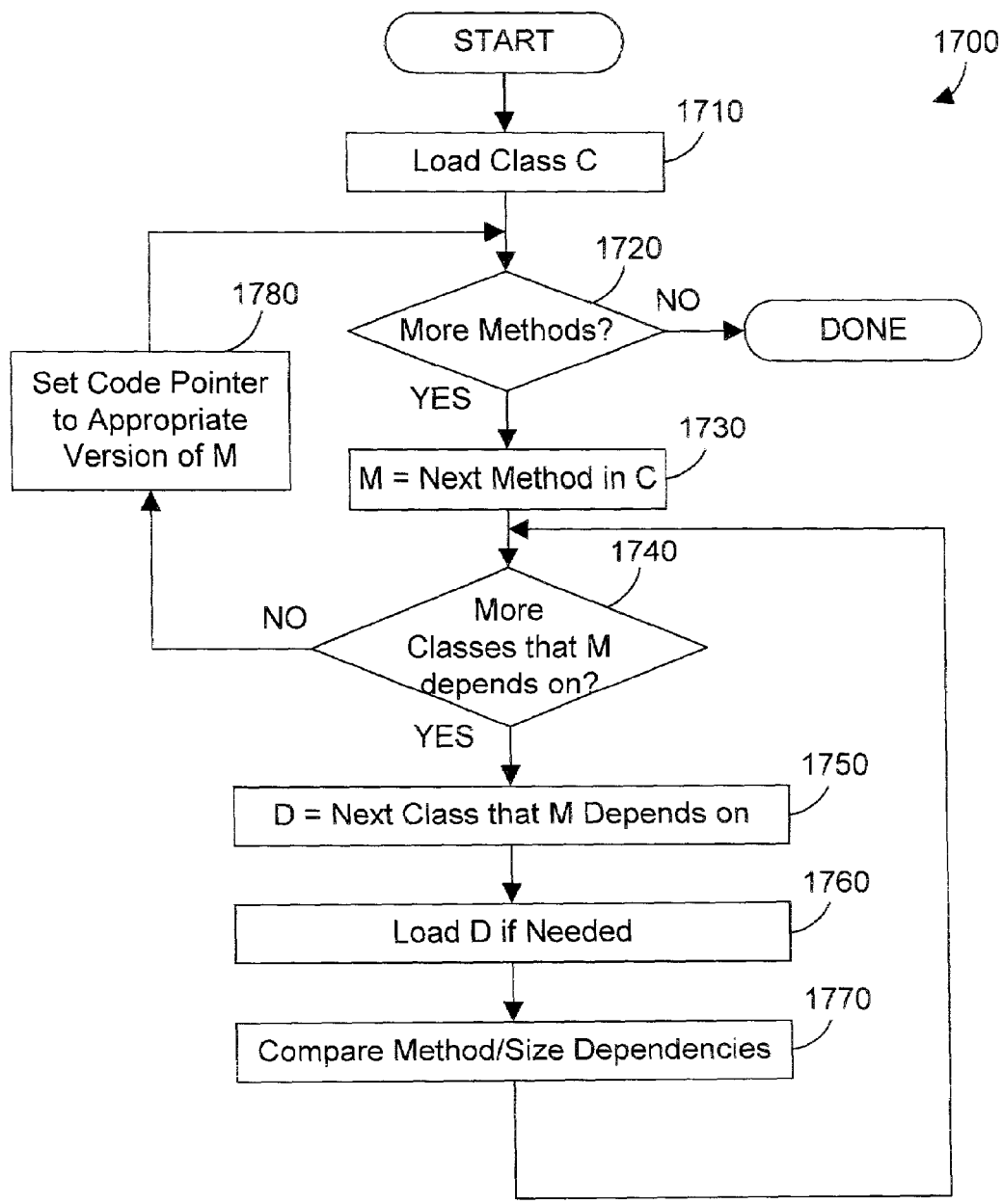
FIG. 17 is a flow diagram of a method in accordance with the preferred embodiments for performing checks to determine which version of a method will be executed at run time.

At run time, method 1700 of FIG. 17 is used to determine which versions of code should be used, for those methods having two versions. Step 1710 loads the Percussionist class into the Java virtual machine. There is a method left to process (step 1720), so M is set to the acquireEquipment method (step 1730). Because M has a method dependency on Mallet, and size dependencies on Mallet and Drum, step 1740=YES. Step 1750 sets D to be the Mallet class, which is loaded in step 1760 if it hasn't been loaded already. The timestamp and checksum of the loaded Mallet class are compared with the data recorded in the method dependency table (step 1770). For purposes of this example, we will assume these match (the Mallet class has not changed since compile time). The size of Mallet objects for the loaded class is also compared with the recorded size and found to match. There is another dependency to consider (step 1740=YES), so D is set to be the Drum class, which again is loaded in step 1760 if it hasn't been already. The size of Drum objects for the loaded class is compared with the recorded size and found to match. There are no more classes to consider (step 1740=NO), and all dependencies are satisfied, so the code pointer for acquireEquipment is set to the version that uses stack allocation for sites S4 and S5 (step 1780). Note that if even one of the dependencies checked in step 1770 had not been satisfied, the code pointer would have been set to the version that uses heap allocation for sites S4 and S5. There are no more methods in the Percussionist class (step 1720=NO), so the run time processing is complete.

The preferred embodiments disclosed herein provide a significant advance over the prior art by allowing some variables in a compilation unit to be allocated on the invoking method's invocation stack if certain conditions are met, even if not all classes are visible in the compilation unit. Allocation decisions are made based on the classes that are visible in the compilation unit and in any user-specified class path. In this manner, an object oriented program that is split among multiple compilation units can benefit from the performance increase that results from optimizations of having objects allocated on a method's invocation stack.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims. For example, while the preferred embodiments are described as having practical application to the allocation of Java objects, the preferred embodiments are not limited to any particular object oriented language.

The invention claimed is:

1. An apparatus comprising:
  at least one processor;
  a memory coupled to the at least one processor;
  a first compilation unit residing in the memory, the first compilation unit comprising a plurality of object oriented classes that are part of an object oriented program, wherein the object oriented program is defined by the combination of the first compilation unit and at least one other compilation unit; and
  a compiler residing in the memory and executed by the at least one processor in a partial compilation environment, the compiler allocating at least one object in the first compilation unit to an invocation stack frame for a method in the first compilation unit that allocates the at least one object, wherein the compiler comprises:
    an escape analysis mechanism that operates on the first compilation unit prior to a second compilation unit and marks each instruction in the first compilation unit that allocates a new object as one of global escape, no escape, and arg escape based on information available from classes visible in the first compilation unit but not visible in the uncompiled second compilation unit; and
    an object allocation mechanism that allocates at least one object that is created by an instruction marked as no escape by the escape analysis mechanism to an invocation stack frame for a method that allocates the object prior to compilation of the second compilation unit.

2. The apparatus of claim 1 wherein the escape analysis mechanism marks each instruction in the first compilation unit that allocates a new object as one of global escape, no escape, and arg escape based on information available from classes visible in the first compilation unit and from classes that are outside the first compilation unit that are visible in a specified classpath.

3. An apparatus comprising:
  at least one processor;
  a memory coupled to the at least one processor;
  a first compilation unit residing in the memory, the first compilation unit comprising a plurality of object oriented classes that are part of an object oriented program, wherein the object oriented program is defined by the combination of the first compilation unit and at least one other compilation unit; and
  a compiler residing in the memory and executed by the at least one processor in a partial compilation environment, the compiler allocating at least one object in the first compilation unit to an invocation stack frame for a method in the first compilation unit that allocates the at least one object
  wherein the compiler comprises:
    a code generator that creates two versions of code for a selected object method, a first version using stack allocation of objects and a second version using heap allocation of objects; and
    a run time code selector that selects one of the first and second versions to execute at run time based on a determination of whether classes seen at run time match expected classes within predetermined limits.

4. An apparatus comprising:
  at least one processor;
  a memory coupled to the at least one processor;
  a first compilation unit residing in the memory, the first compilation unit comprising a plurality of object oriented classes that are part of an object oriented program, wherein the object oriented program is defined by the combination of the first compilation unit and at least one other compilation unit; and
  a compiler residing in the memory and executed by the at least one processor in a partial compilation environment, the compiler comprising:
    an escape analysis mechanism that operates on the first compilation unit prior to a second compilation unit and that marks each instruction in the first compilation unit that allocates a new object as one of global escape, no escape, and arg escape based on information available from classes visible in the first compilation unit but not visible in the uncompiled second compilation unit and from classes that are outside the first compilation unit that are visible in a specified classpath;
    an object allocation mechanism that allocates at least one object that is created by an instruction marked as no escape by the escape analysis mechanism to an invocation stack frame for a method that allocates the object;
    a code generator that creates two versions of code for a selected object method, a first version using stack allocation of objects and a second version using heap allocation of objects; and
    a run time code selector that selects one of the first and second versions to execute at run time based on a determination of whether classes seen at run time match expected classes within predetermined limits.

5. A method for allocating objects to memory in an object oriented program that comprises a first compilation unit and a second compilation unit, the method comprising the steps of:
  (A) compiling the first compilation unit;
  (B) during the compiling of the first compilation unit and before the compilation of the second compilation unit, marking each instruction that allocates a new object as one of global escape, no escape, and arg escape based on information available from classes in the first compilation unit and from classes that are outside the first compilation unit that are visible in a specified classpath; and
  allocating at least one object that is created by an instruction marked as no escape by the escape analysis mechanism to an invocation stack frame for a method that allocates the at least one object prior to compilation of the second compilation unit.

6. The method of claim 5 wherein step (B) comprises the steps of:

creating two versions of code for a selected object method, a first version using stack allocation of objects and a second version using heap allocation of objects; and selecting at run time one of the first and second versions to execute at run time based on a determination of whether classes seen at run time match expected classes within predetermined limits.

7. In an object oriented computer program that comprises a first compilation unit and at least one other compilation unit, a method for allocating objects in the first compilation unit to memory, the method comprising the steps of:

marking each instruction that allocates a new object as one of global escape, no escape, and arg escape based on information available from classes in the first compilation unit and from classes that are outside the first compilation unit that are visible in a specified classpath;

creating two versions of code for a selected object method, a first version using stack allocation of objects and a second version using heap allocation of objects; and selecting at run time one of the first and second versions to execute at run time based on a determination of whether classes seen at run time match expected classes within predetermined limits.

8. A program product comprising:

a compiler that compiles in a partial compilation environment a first compilation unit comprising a plurality of object oriented classes that are part of an object oriented program, wherein the object oriented program is defined by the combination of the first compilation unit and at least one other compilation unit, the compiler allocating at least one object in the first compilation unit to an invocation stack frame for a method in the first compilation unit that allocates the at least one object; wherein the compiler comprises:

an escape analysis mechanism that operates on the first compilation unit prior to a second compilation unit and marks each instruction in the first compilation unit that allocates a new object as one of global escape, no escape, and arg escape based on information available from classes visible in the first compilation unit; and an object allocation mechanism that allocates at least one object that is created by an instruction marked as no escape by the escape analysis mechanism to an invocation stack frame for a method that allocates the object prior to compilation of the second compilation unit;

wherein the escape analysis mechanism marks each instruction in the first compilation unit that allocates a new object as one of global escape, no escape, and arg escape based on information available from classes visible in the first compilation unit but not visible in the uncompiled second compilation unit and from classes that are outside the first compilation unit that are visible in a specified classpath; and recordable signal bearing media bearing the compiler.

9. The program product of claim 7 wherein the compiler comprises:

a code generator that creates two versions of code for a selected object method, a first version using stack allocation of objects and a second version using heap allocation of objects; and a run time code selector that selects one of the first and second versions to execute at run time based on a determination of whether classes seen at run time match expected classes within predetermined limits.

10. A program product comprising:

(A) a compiler that compiles a first compilation unit comprising a plurality of object oriented classes that are part of an object oriented program, wherein the object oriented program is defined by the combination of the first compilation unit and at least one other compilation unit, the compiler comprising:

(A1) an escape analysis mechanism that marks each instruction that allocates a new object as one of global escape, no escape, and arg escape based on information available from classes in the first compilation unit and from classes that are outside the first compilation unit that are visible in a specified classpath;

(A2) an object allocation mechanism that allocates at least one object that is created by an instruction marked as no escape by the escape analysis mechanism to an invocation stack frame for a method that allocates the object;

(A3) a code generator that creates two versions of code for a selected object method, a first version using stack allocation of objects and a second version using heap allocation of objects; and (A4) a run time code selector that selects one of the first and second versions to execute at run time based on a determination of whether classes seen at run time match expected classes within predetermined limits; and (B) recordable signal bearing media bearing the compiler.

* * * * *